United States Patent
Belz, Jr. et al.

(10) Patent No.: US 8,873,729 B2
(45) Date of Patent: *Oct. 28, 2014

(54) METHODS, SYSTEMS, AND PRODUCTS FOR PROVIDING RING TONES

(75) Inventors: Steven M. Belz, Jr., Cedar Park, TX (US); Larry Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/480,510

(22) Filed: May 25, 2012

(65) Prior Publication Data

US 2012/0233208 A1    Sep. 13, 2012

Related U.S. Application Data

(63) Continuation of application No. 12/270,029, filed on Nov. 13, 2008, now Pat. No. 8,213,591.

(51) Int. Cl.
*H04M 3/42* (2006.01)
*H04M 3/02* (2006.01)

(52) U.S. Cl.
CPC *H04M 3/42* (2013.01); *H04M 3/02* (2013.01); *H04M 2207/20* (2013.01)
USPC ............................. 379/207.16; 379/201.01

(58) Field of Classification Search
USPC ........................ 379/207.16, 201.01
See application file for complete search history.

(56) References Cited

U.S. PATENT DOCUMENTS

| | | |
|---|---|---|
| 5,200,994 A | 4/1993 | Sasano |
| 5,544,235 A | 8/1996 | Ardon |
| 6,178,230 B1 | 1/2001 | Borland |
| 6,671,370 B1 | 12/2003 | Heinonen |
| 6,711,239 B1 | 3/2004 | Borland |
| 6,745,040 B2 | 6/2004 | Zimmerman |
| 6,850,608 B2 | 2/2005 | Kalan |
| 7,088,994 B2 | 8/2006 | Uhlmann |
| 7,106,846 B2 | 9/2006 | Nguyen |
| 7,315,738 B1 | 1/2008 | Delker |
| 2002/0077102 A1 | 6/2002 | Achuthan |
| 2003/0108189 A1 | 6/2003 | Barzani |
| 2006/0177044 A1 | 8/2006 | O'Neil et al. |
| 2007/0064921 A1 | 3/2007 | Albukerk |
| 2007/0176742 A1 | 8/2007 | Hofmann et al. |
| 2007/0189504 A1 | 8/2007 | Silver |
| 2007/0264978 A1 | 11/2007 | Stoops |
| 2009/0092237 A1* | 4/2009 | Chang et al. ............... 379/93.25 |
| 2010/0087182 A1* | 4/2010 | Stewart et al. ............... 455/419 |

* cited by examiner

*Primary Examiner* — Quynh Nguyen
(74) *Attorney, Agent, or Firm* — Scott P. Zimmerman, PLLC

(57) ABSTRACT

Methods, systems, and products are disclosed for processing a ring tone. An electronic database is queried for a calling number, and contact information associated with the calling number is retrieved. A ring tone database is queried for the contact information, and the ring tone database stores an association between the contact information and a ring tone. The ring tone associated with the contact information is retrieved and processed to alert a called number to a communication from the calling number.

20 Claims, 22 Drawing Sheets

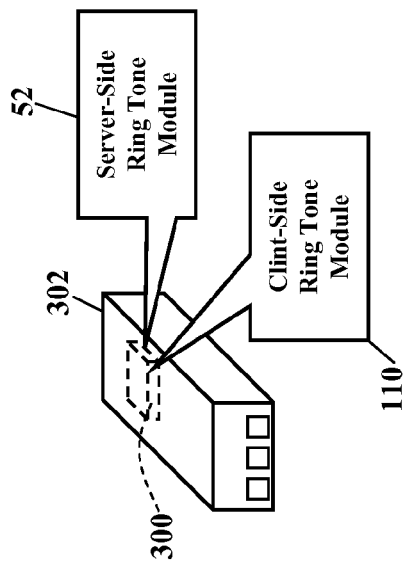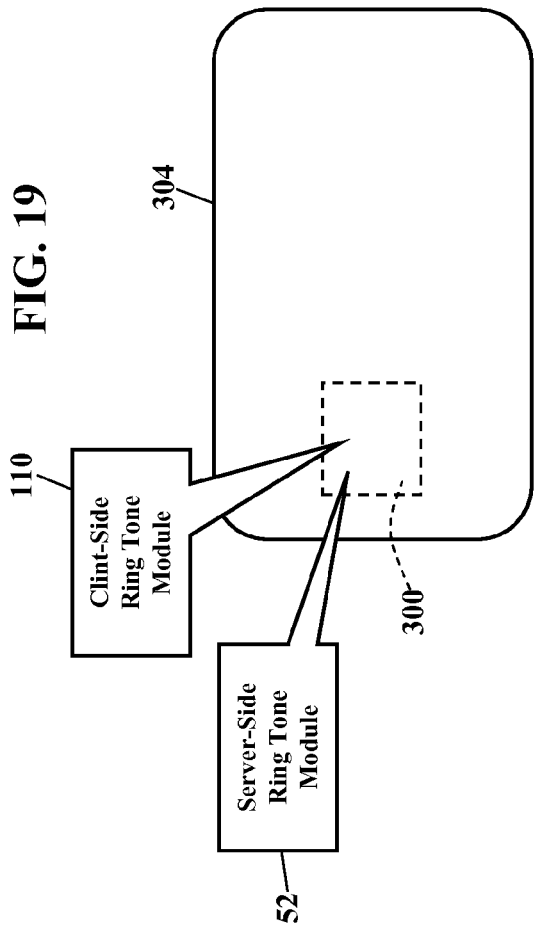

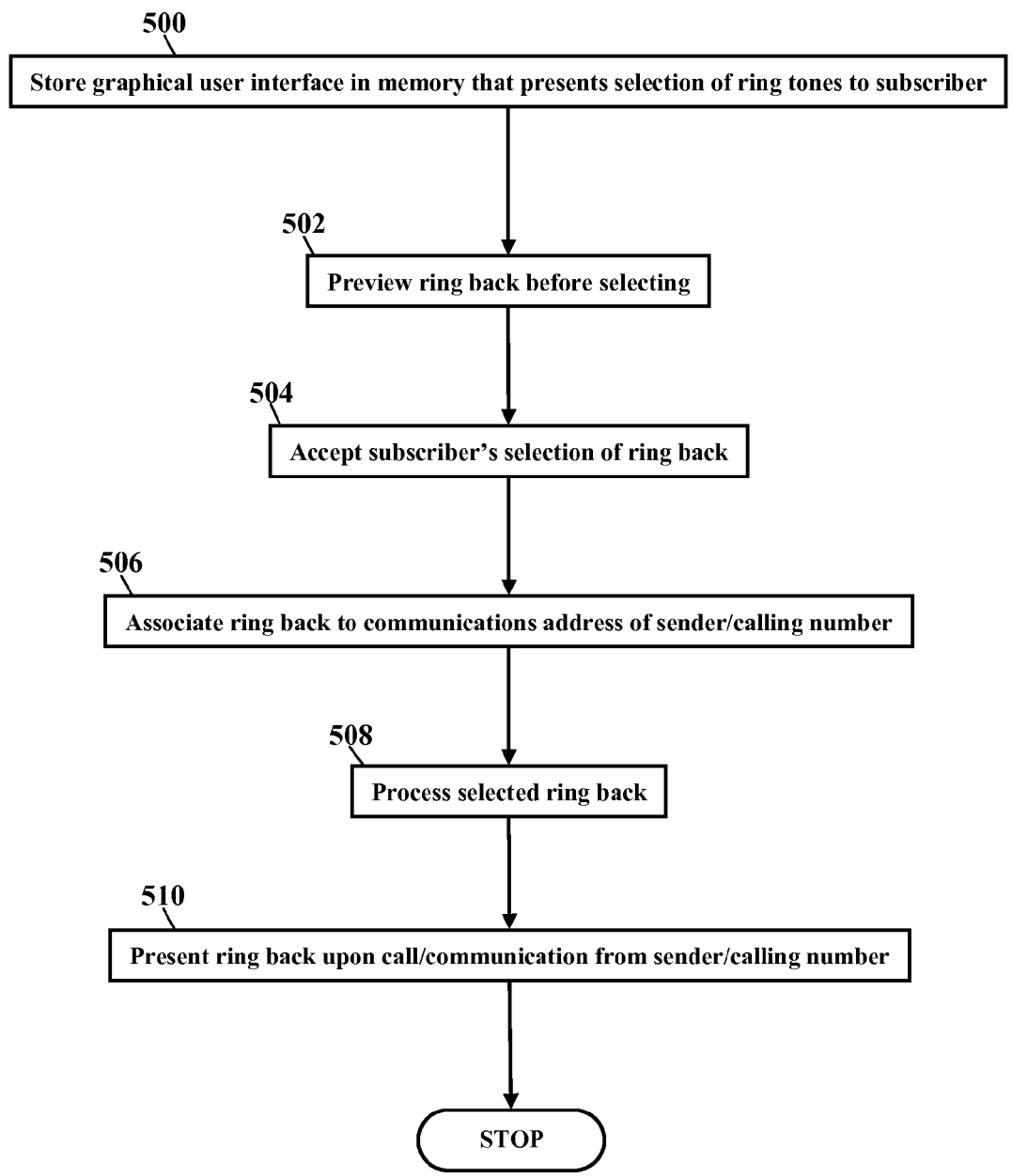

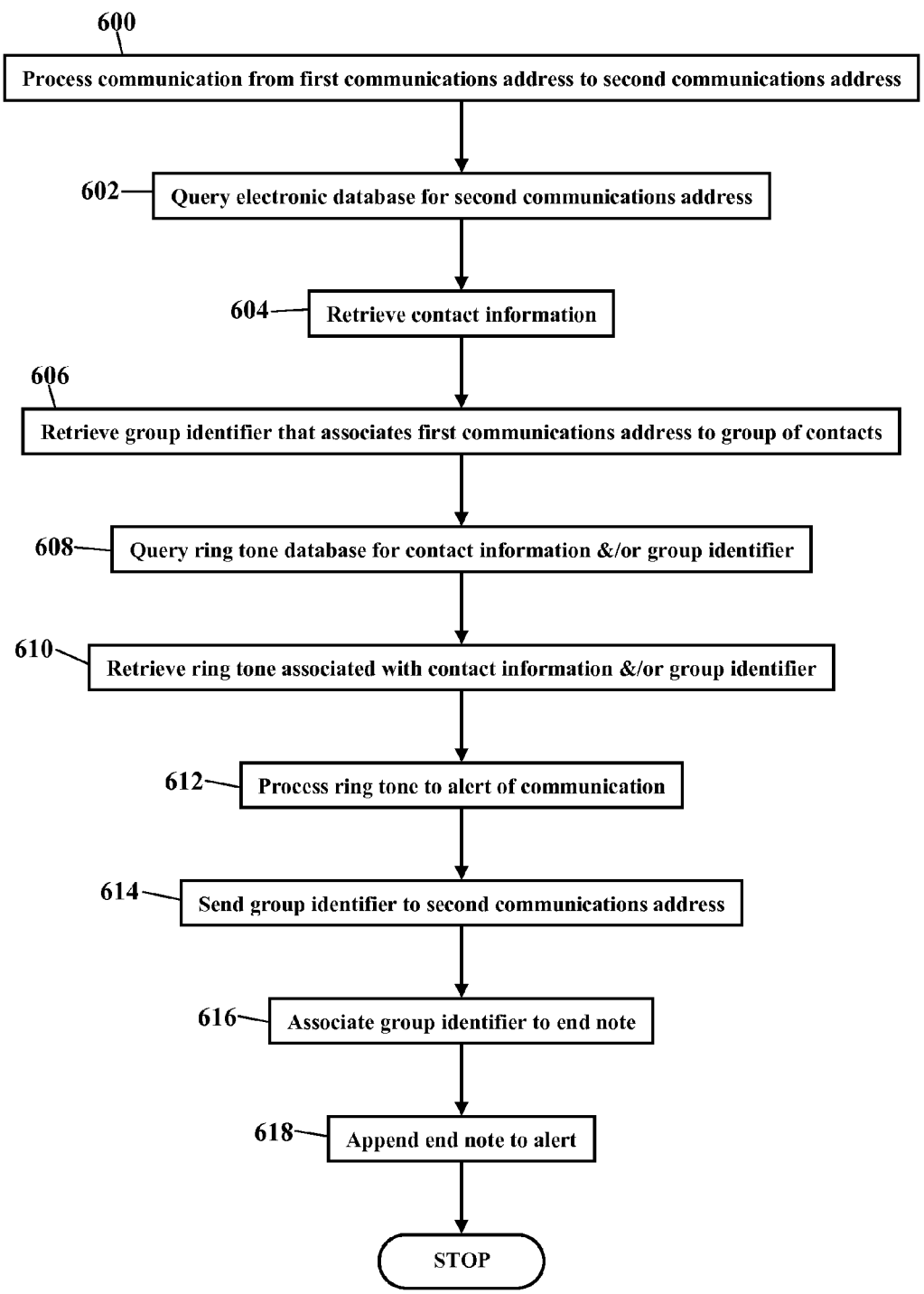

METHODS, SYSTEMS, AND PRODUCTS FOR PROVIDING RING TONES

CROSS-REFERENCE TO RELATED APPLICATIONS

This application is a continuation of U.S. application Ser. No. 12/270,029, filed Nov. 13, 2008, now issued as U.S. Pat. No. 8,213,591, and incorporated herein by reference in its entirety.

BACKGROUND

Exemplary embodiments generally relate to telephonic communications and to telecommunications and, more particularly, to call alerting, to supervisory control line signaling, and to special services.

Personalized phones are very popular. Mobile phones, for example, can be personalized with selected ring tones, colorful and themed covers, and even more unique phone designs. Recently customers can even download songs and other ring tones to further personalize their phones. Customers desire these personalized features, and these personalized features are profitable for the service provider. Service providers and customers thus benefit from an ever expanding selection of personalized features.

SUMMARY

Exemplary embodiments provide methods, systems, apparatuses, and products for a ring tone service. This ring tone service provides a customizable alert to a called party. As most people know, an alert is produced when an incoming telephone call, email, or other communication is received. The alert may be a ring, flashing light, vibration, or other indicator. The ring tone service described herein, though, allows a subscriber to customize the alert that indicates the incoming communication. That is, ring tones may be "personalized" by a subscriber, and this ring tone service provides an additional revenue opportunity for the service provider.

Exemplary embodiments include a method of processing a ring tone. A communication is processed from a calling number to a called number. An electronic database is queried for the calling number, and contact information associated with the calling number is retrieved. A ring tone database is queried for the contact information, and the ring tone database stores an association between the contact information and a ring tone. The ring tone associated with the contact information is retrieved and processed to alert the called number to the communication from the calling number.

Other exemplary embodiments include a processor-controlled device that provides a ring tone. The processor-controlled device is operative to process a communication from a calling number to a called number. An electronic database is queried for the calling number, and contact information associated with the calling number is retrieved. A ring tone database is queried for the contact information, and the ring tone database stores an association between the contact information and a ring tone. The ring tone associated with the contact information is retrieved and processed to alert the called number to the communication from the calling number.

More exemplary embodiments describe a computer readable storage medium that stores processor-executable instructions for processing a ring tone. A communication is processed from a calling number to a called number. An electronic database is queried for the calling number, and contact information associated with the calling number is retrieved. A ring tone database is queried for the contact information, and the ring tone database stores an association between the contact information and a ring tone. The ring tone associated with the contact information is retrieved and processed to alert the called number to the communication from the calling number.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 17-20 are schematics further illustrating various communications devices for presenting ring tones, according to exemplary embodiments;

FIGS. 22 and 23 are flowcharts illustrating method of providing a personalized ring tone, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
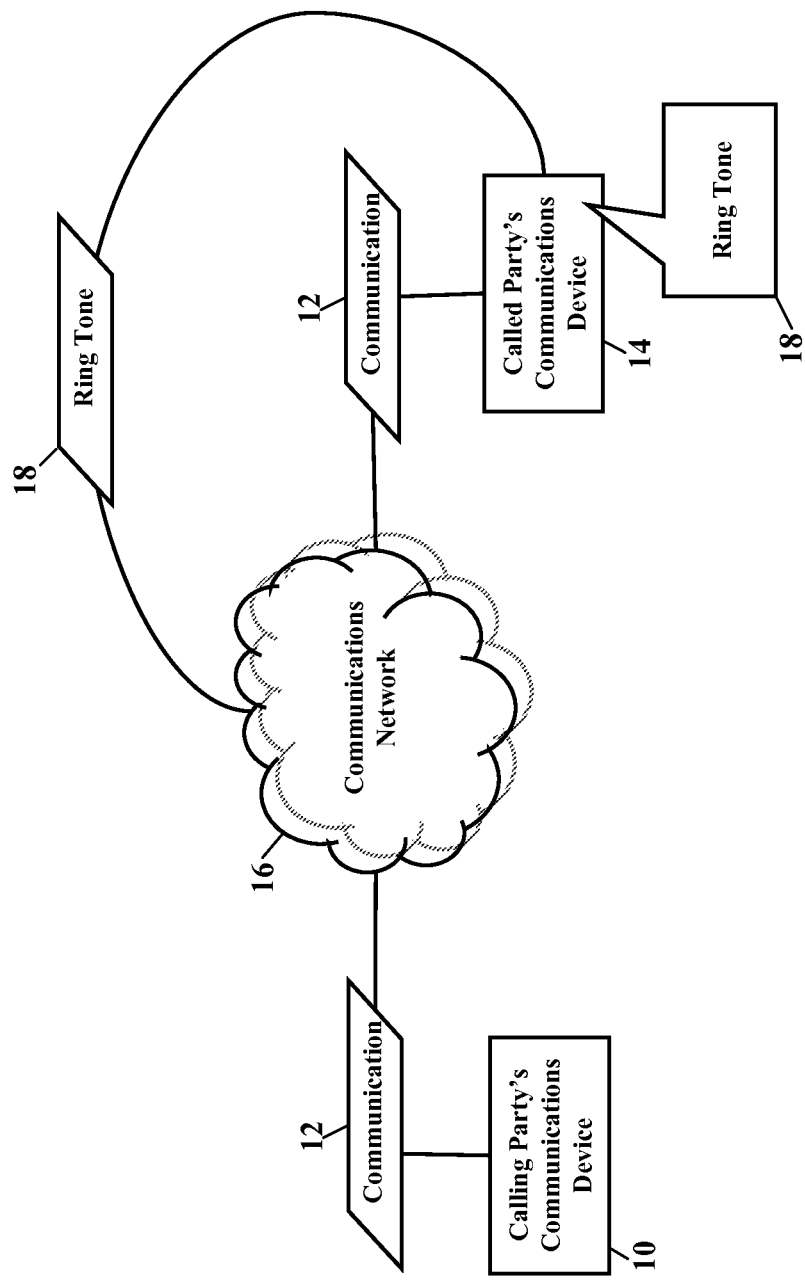
FIG. 1 is a simplified schematic illustrating a ring tone service, according to exemplary embodiments.
Figure 2:
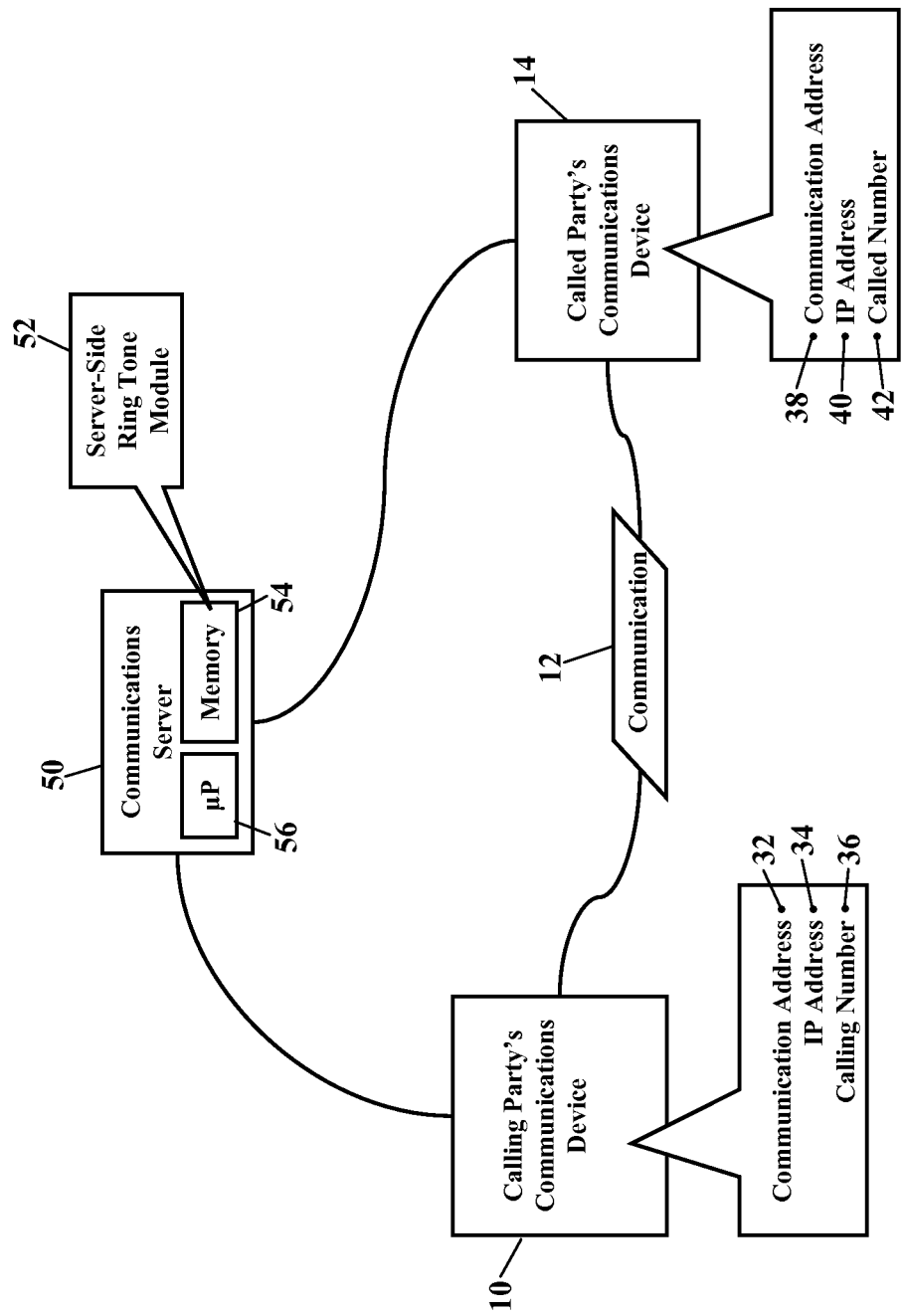
FIGS. 2-5 are more detailed schematics illustrating the ring tone service, according to more exemplary embodiments.

FIG. 1 is a simplified schematic illustrating a ring tone service, according to exemplary embodiments. A calling party, using the calling party's communications device 10, initiates a communication 12 to a called party's communications device 14. The communication 12 may be any form of electronic communication (such as an email, instant message, page, or facsimile communication), a Plain Old Telephone System telephone call, and/or an Internet Protocol telephone call. The communication 12 routes from the calling party's communications device 10 via a communications network 16 to the called party's communications device 14. The called party's communications device 14 then produces a ring tone 18. The ring tone 18 may be any note(s), song, and/or audible feature that alerts of the incoming communication 12. The ring tone 18 may also include visual or tactile features, such as a flashing light, display of video, and/or vibration that alerts to the incoming communication 12. As later paragraphs will explain, the ring tone 18 may be sent or delivered to the called party's communications device 14, or the ring tone 18 may be retrieved and played by the called party's communications device 14. Regardless, the ring tone 18 alerts the called party to the communication 12.

Exemplary embodiments, however, allow the ring tone 18 to be personalized. If the called party and/or the calling party subscribes to this ring tone service, the called party and/or the calling party may select aspects of the ring tone 18 that is presented by the called party's communications device 14. When the called party sees/hears/feels the ring tone 18, the ring tone 18 may be personalized. The personalized ring tone 18 may be any music, tone(s), and/or graphics that indicate the identity of the calling party, the identity of the called party, and/or the subject matter of the communication. A unique .mp3 file, for example, may be presented when mom calls. The soundtrack to "Rocky Balboa" may indicate that an incoming communication is intended for dad. As later paragraphs will explain, the ring tone 18 may even indicate the subject matter of the communication. The "Star-Spangled Banner," for example, may indicate that an incoming call is related to a cub scouts function. The ring tone 18 may be any picture, portion of a movie, self-composed music, or any other content that may be presented by the called party's communications device 14. The ring tone 18 may even be personalized with streamed audio and/or video content, such as radio, stock quotes, news, weather, and/or advertisements. The ring tone 18 may also be personalized using logical rules, such as personalization by the month, the day of the week, and/or the time of day. The ring tone 18, in other words, may be personalized to provide any indication of the calling party, the called party, and/or the subject matter content of the communication 12.

As later paragraphs will explain, exemplary embodiments may also represent social relationships. Ring tones may be defined for social networking groups, such as FACEBOOK® and MY SPACE®. If the calling party and/or the called party is a FACEBOOK® or MY SPACE® friend, for example, a predetermined ring tone may be presented to alert of that social group. FACEBOOK® friends may have a different ring tone from MY SPACE® friends. Similarly, ring backs may be defined for other social and professional networking groups.

FIGS. 2-5 are more detailed schematics of the ring tone service, according to exemplary embodiments. When the calling party's communications device 10 initiates or sends the communication 12, the communication 12 originates from a communications address 32 associated with the calling party's communications device 10. If the communication 12 is an email or Voice-over Internet Protocol call, for example, then the communication 12 originates from an Internet Protocol address 34 associated with the calling party's communications device 14. If the communication 12 is a telephone call or Voice-over Internet Protocol call, then the communication 12 may originate from a calling telephone number 36 associated with the calling party's communications device 10. The communication 12 routes to a communications address 38 (e.g., Internet Protocol address 40 or called telephone number 42) associated with the called party's communications device 14. Regardless, the communication network (illustrated as reference numeral 16 in FIG. 1) processes the communication 12 for eventual delivery or termination at the called party's communications device 14.

A communications server 50 may help provide the ring tone service. The communications server 50 operates at any location within the communications network (illustrated as reference numeral 16 in FIG. 1). The communications server 50 may store and execute a server-side ring tone module 52. The server-side ring tone module 52 may be stored in memory 54 of the communications server 50. A processor 56 may communicate with the server's memory 54 and execute the server-side ring tone module 52. The server-side ring tone module 52 may control or manage the ring tone service for the calling party and/or for the called party. The server-side ring tone module 52 may comprise methods, computer programs, and/or computer program products that help provide a customer a personalized ring tone service to the called party's communications device 14. As the communication 12 is processed to the communications address 38 associated with the called party's communications device 14, the communications server 50 is notified that personalized ring tone service is desired. The communications server 50, for example, may process the communication 12 and compare telephone numbers and/or Internet Protocol addresses to determine that personalized ring tone service is desired. The communications server 50 may additionally or alternatively be informed or notified that personalized ring tone service is desired. Regardless, when personalized ring tone service is required, the server-side ring tone module 52 queries one or more electronic databases when providing the ring tone service.

Figure 3:
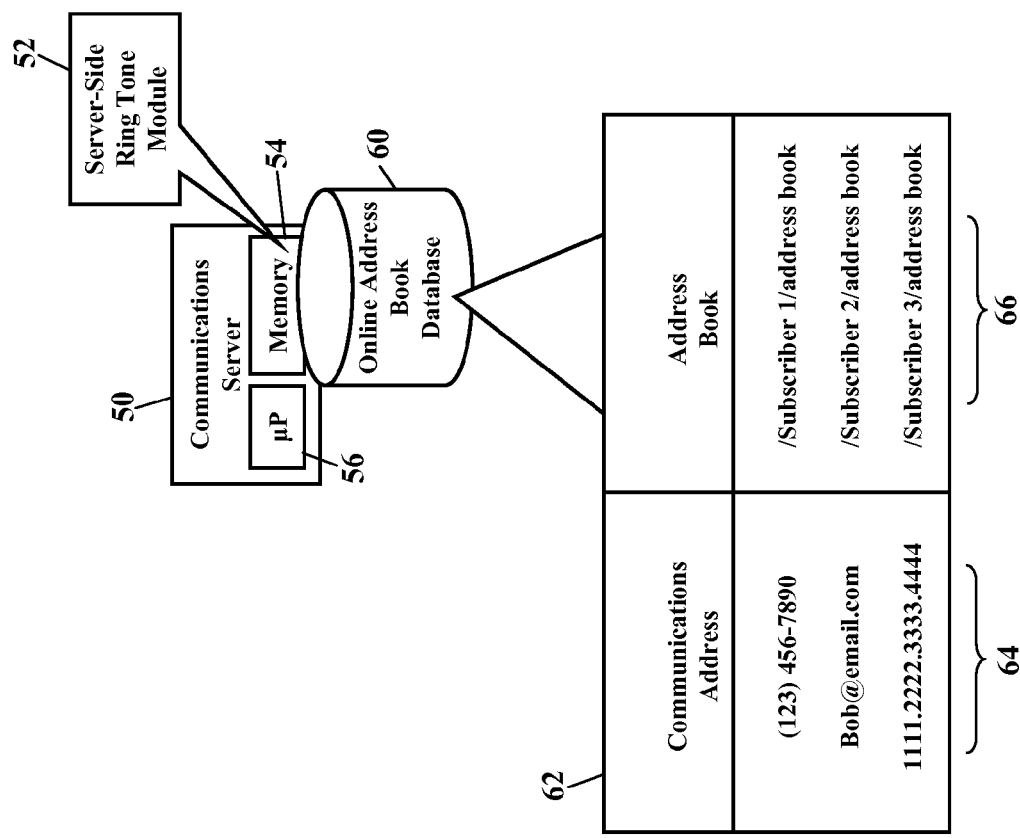

As FIG. 3 illustrates, for example, the server-side ring tone module 52 may query an online address book database 60. The online address book database 60 may store one or more subscriber's online address books. As a subscriber's number of contacts grows, the online address book database 60 provides a single repository for all of the subscriber's contacts. The online address book database 60 is easily accessible and reduces, or even eliminates, the need to synchronize different contacts databases that are maintained on separate communications devices. The online address book database 60 is illustrated as being locally stored in the memory 54 of the communications server 50, but the online address book database 60 may be remotely stored and maintained at any location within the communications network (illustrated as reference numeral 16 in FIG. 1). The online address book database 60 is illustrated as a table 62 that maps or relates communications addresses 64 to address books 66. The server-side ring tone module 52 queries the online address book database 60 for the called party's communications address 38 (e.g., the Internet Protocol address 40 or the called telephone number 42 illustrated in FIG. 2). The online address book database 60 performs a lookup and retrieves the corresponding address book 66 that is associated with the called party's communications address 38.

Figure 4:
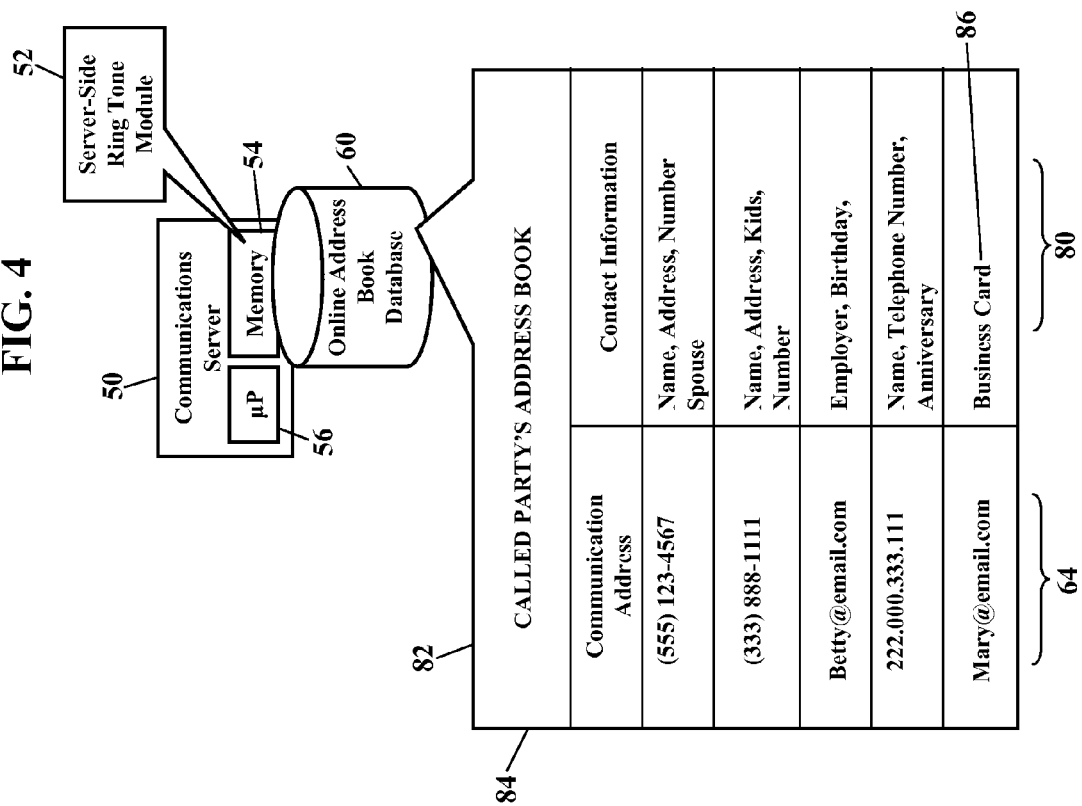

As FIG. 4 illustrates, the server-side ring tone module 52 may then retrieve contact information 80. Once the called party subscriber's address book 82 is obtained from the online address book database 60, the called party's address book 82 may be used to retrieve the contact information 80. FIG. 4 illustrates the called party's address book 82 as a table 84 that maps or relates the communications addresses 64 to the contact information 80. The contact information 80 may be any information that is associated to the called party's address book 82. The contact information 80, for example, may be a name, physical address, and/or telephone number associated with a calling party. The contact information 80, though, may additionally or alternatively include family members, employment information, alternative telephone or email addresses, birthday(s), and anniversaries. The contact information 80 may even include a virtual business card file 86. The server-side ring tone module 52 queries the called party's address book 82 for the calling party's communications address 32 (e.g., the calling party's Internet Protocol address 34 or calling telephone number 36 illustrated in FIG. 2). The server-side ring tone module 52 retrieves the contact information 80 associated with the calling party's communications address 32.

Figure 5:
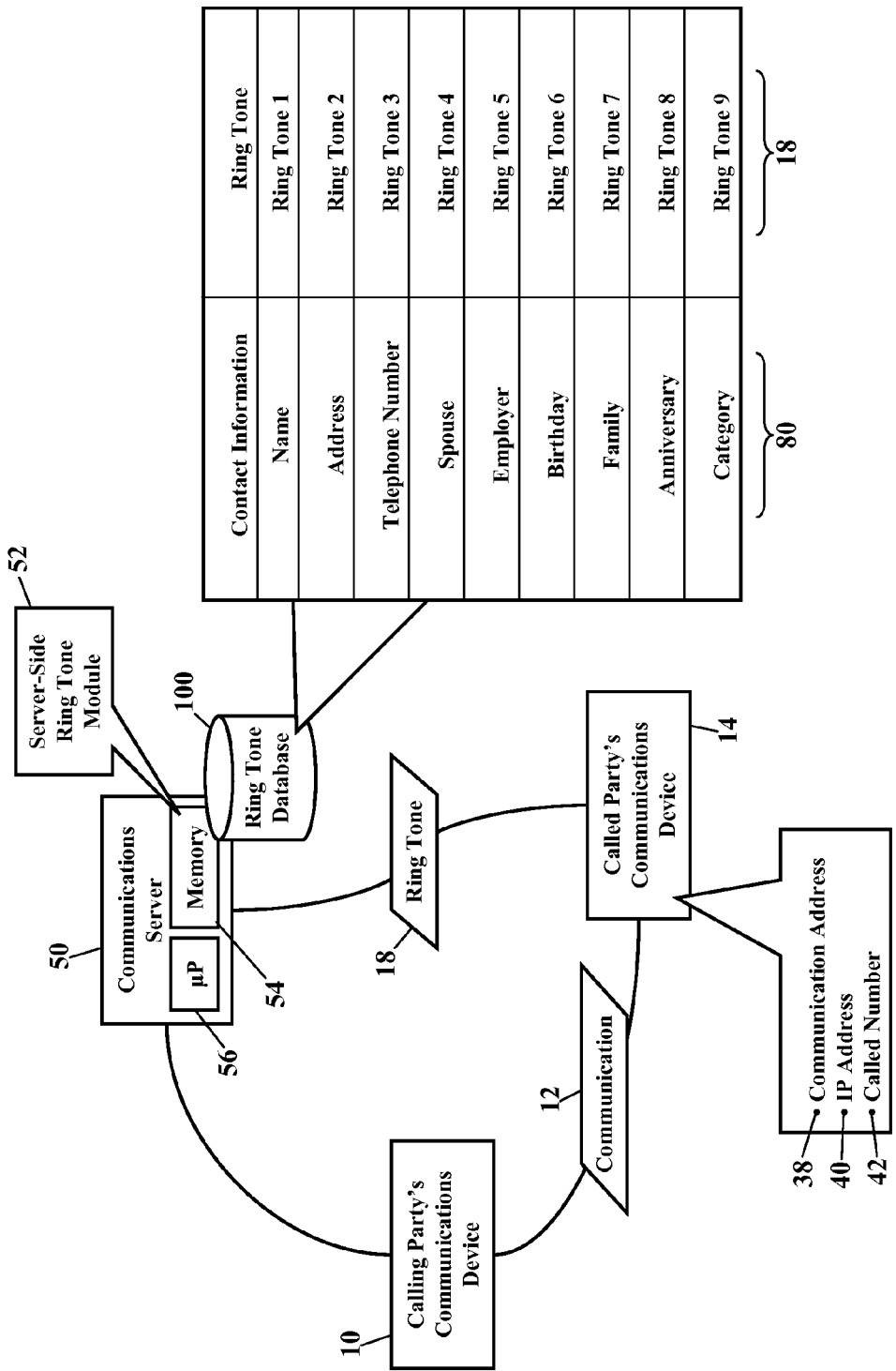

FIG. 5 illustrates a ring tone database 100. The ring tone database 100 may store an association between the contact information 80 and the corresponding ring tone 18. The ring tone database 100 is illustrated as being locally stored in the communications server 50, but the ring tone database 100 may be remotely located and accessible within the communications network (illustrated as reference numeral 16 in FIG. 1). Regardless, the communications server 50 queries the ring tone database 100 for the contact information 80. FIG. 5 illustrates the ring tone database 100 as a table or map that relates the contact information 80 to the corresponding ring tone 18. The ring tone database 100 retrieves the personalized ring tone 18 associated with the contact information 80. The server-side ring tone module 52 then causes the communications network 16 to process the personalized ring tone 18 as an audible and/or visual alert to the incoming communication 12. The communications server 50, for example, sends or routes the .mpg file, .wav file, or picture file to the communications address 38 (e.g., Internet Protocol address 40 or called telephone number 42) associated with the called party's communications device 14. The called party's communications device 14 then audibly, visually, and/or tactilely presents the ring tone file 18.

Exemplary embodiments may be applied regardless of networking environment. The communications network 16 may be a cable network operating in the radio-frequency domain and/or the Internet Protocol (IP) domain. The communications network 16, however, may also include a distributed computing network, such as the Internet (sometimes alternatively known as the "World Wide Web"), an intranet, a local-area network (LAN), and/or a wide-area network (WAN). The communications network 16 may include coaxial cables, copper wires, fiber optic lines, and/or hybrid-coaxial lines. The communications network 16 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 16 may even include powerline portions, in which signals are communicated via electrical wiring. The concepts described herein may be applied to any wireless/wireline communications network, regardless of physical componentry, physical configuration, or communications standard(s).

The communications server 50 is only simply illustrated. Because the architecture and operating principles of computers and processor-controlled devices are well known, their hardware and software components are not further shown and described. If the reader desires more details, the reader is invited to consult the following sources, all incorporated herein by reference: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 6:
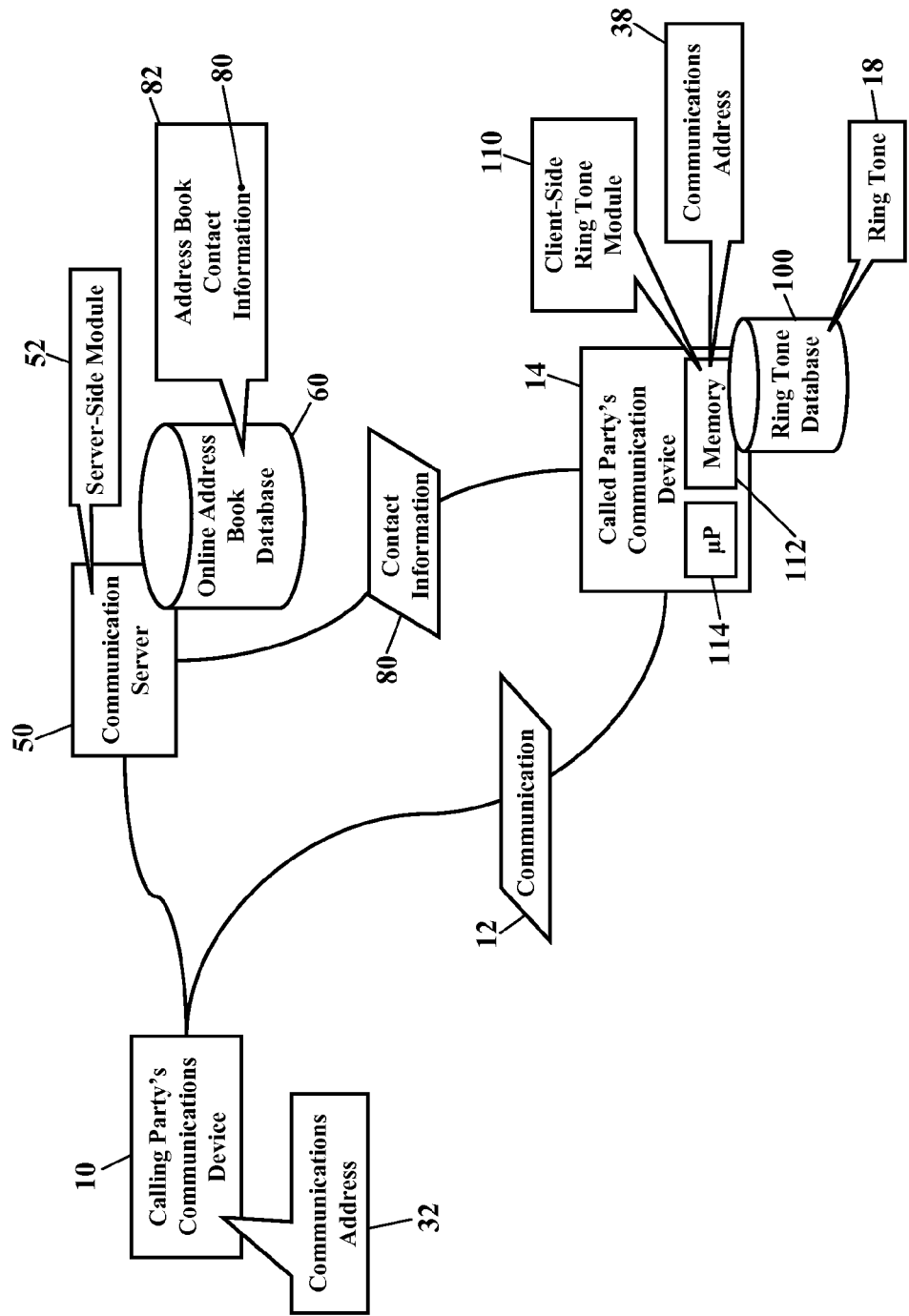
FIG. 6 is a schematic illustrating local retrieval of a ring tone, according to exemplary embodiments.

FIG. 6 is a schematic illustrating local retrieval of the ring tone 18, according to exemplary embodiments. Here the server-side ring tone module 52 retrieves and forwards the contact information 80 to the called party's communications device 14. The called party's communications device 14 may then retrieve the ring tone 18 that corresponds to the contact information 80. As FIG. 6 illustrates, the server-side ring tone module 52 queries the online address book database 60 for the called party's communications address 38 and retrieves the called party's address book 82. The server-side ring tone module 52 then queries the called party's address book 82 for the calling party's communications address 32. The server-side ring tone module 52 then retrieves the contact information 80 associated with the calling party's communications address 32. Here, though, the contact information 80 is then forwarded to the called party's communications device 14. The called party's communications device 14 then uses the contact information 80 to retrieve the personalized ring tone 18.

As FIG. 6 illustrates, the called party's communications device 10 may execute a client-side ring tone module 110. The client-side ring tone module 110 may comprise processor executable instructions that are stored in memory 112, and a processor 114 may communicate with the memory 112 to execute the client-side ring tone module 110. The server-side ring tone module 52 and the client-side ring tone module 110 may cooperate to control or manage the ring tone service. When the client-side ring tone module 110 receives the contact information 80, the client-side ring tone module 110 may then query the ring tone database 100 for the contact information 80. FIG. 6 illustrates the ring tone database 100 as being locally stored in the memory 112 of the called party's communications device 10. The ring tone database 100, though, may be remotely stored and accessible via the communications network (illustrated as reference numeral 16 in FIG. 1). The client-side ring tone module 110 queries the ring tone database 100 for the contact information 80. The client-side ring tone module 110 retrieves the ring tone 18 associated with the contact information 80. The client-side ring tone module 110 then instructs the processor 114 to produce or present the ring tone 18 to alert of the incoming communication 12 from the calling party's communications device 10.

Figure 7:
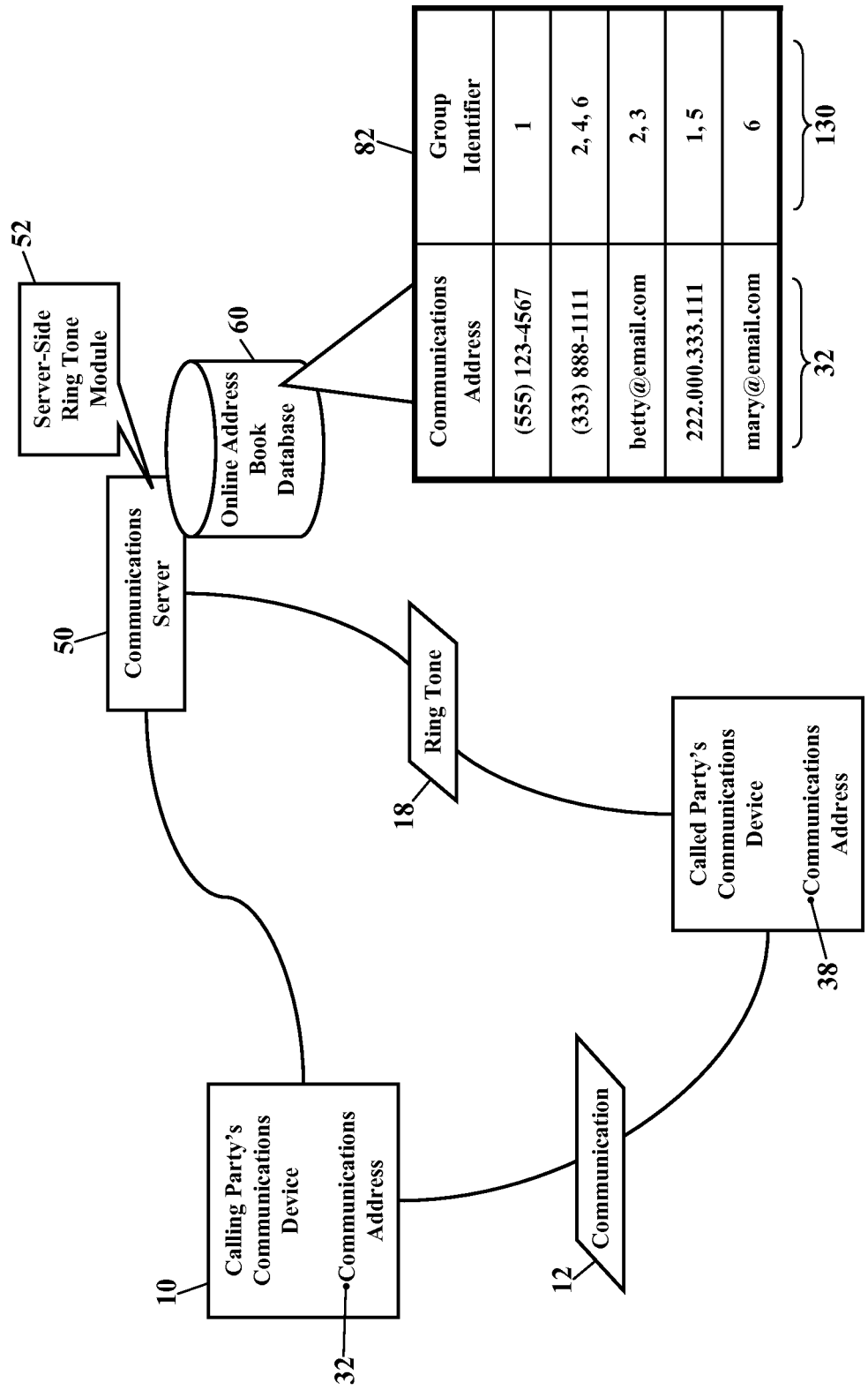
FIGS. 7 and 8 are schematics illustrating contact information, according to exemplary embodiments.
Figure 8:
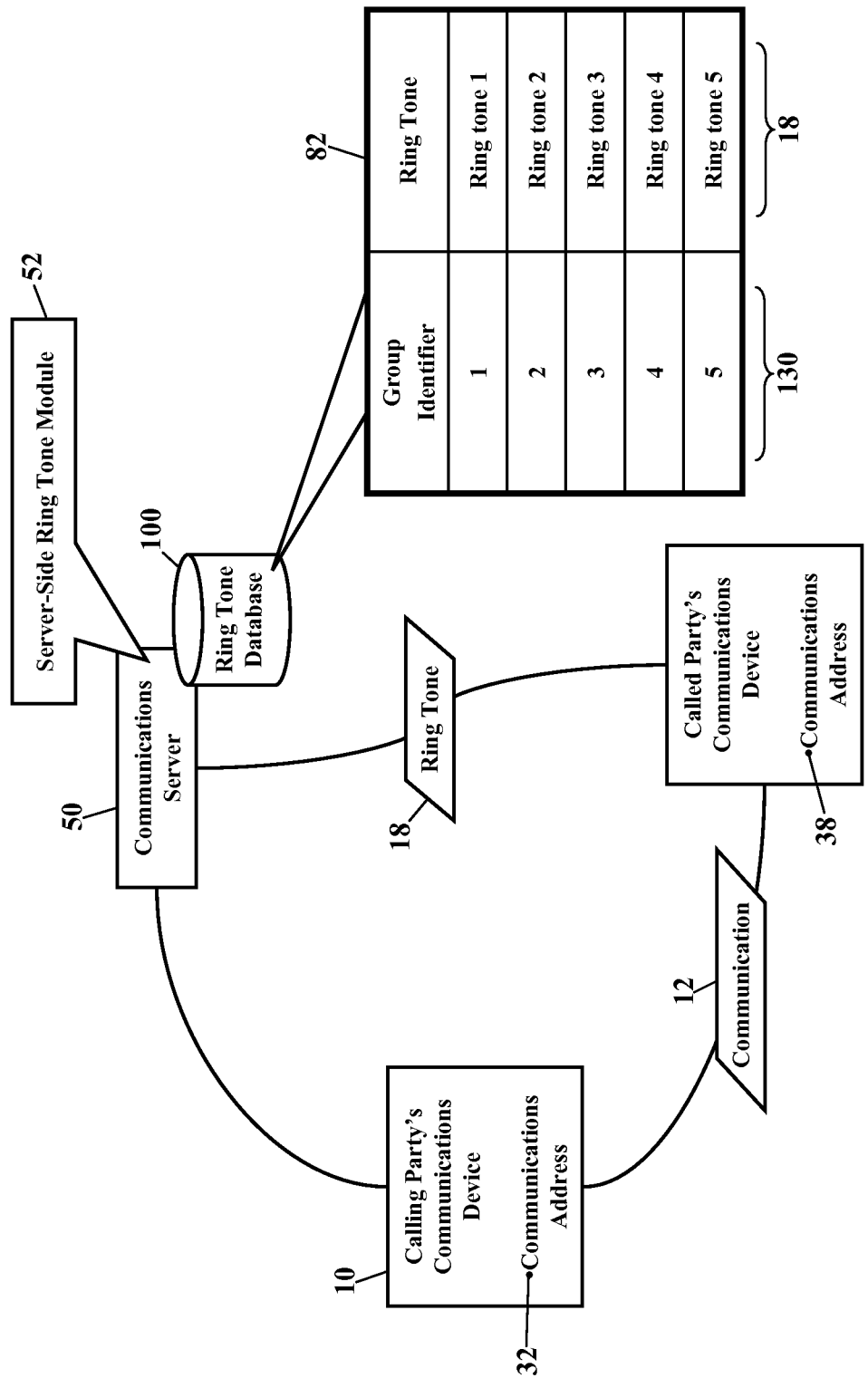

FIGS. 7 and 8 are schematics further illustrating the contact information 80, according to exemplary embodiments. Here the server-side ring tone module 52 may retrieve a group identifier 130 from the called party's address book 82. When the calling party's communications device 10 initiates or sends the communication 12 to the called party's communications device 14, the server-side ring tone module 52 queries the online address book database 60 for the called party's communications address 38. The server-side ring tone module 52 retrieves the corresponding address book 82 that is associated with the called party's communications address 38.

As FIG. 7 illustrates, the calling party's communications address 32 may be associated with the group identifier 130. When a subscriber establishes their corresponding address book 82, the subscriber may associate one or more calling parties to a group or roster. Callers or senders may be grouped according to any common association the subscriber desires. The members of a cub scouts troop, for example, may grouped together, such that each member's communications address(es) is/are associated to the same group identifier 130. The subscriber may group family members with one common group identifier 130 and co-workers with another group identifier 130. Members of a basketball team may share a common group identifier, while members of a book club may share another group identifier. As FIG. 7 illustrates, then, the subscriber's address book 82 may include a mapping, association, or tag between the caller's communications address 32 and the corresponding group identifier 130. As FIG. 7 also illustrates, the caller's communications address 32 may even be associated to multiple group identifiers 130, implying the caller is a member of more than one grouping. The server-side ring tone module 52 may thus retrieve the group identifier 130 that associates the calling party's communications address 32 to a group of contacts in the called party's address book 82.

As FIG. 8 illustrates, ring tones may be then selected according to the group identifier 130. Once the group identifier 130 is known, the server-side ring tone module 52 may then query the ring tone database 100 for the group identifier 130. The ring tone database 100 retrieves the personalized ring tone 18 that is associated with the group identifier 130. The server-side ring tone module 52 then causes the communications network 16 to process the personalized ring tone 18 as an audible and/or visual alert to the incoming communication 12. When the personalized ring tone 18 is produced at the called party's communications device 14, the called party subscriber immediately knows that a member of the grouping is attempting to call or send a communication.

Here, then, exemplary embodiments permit the subscriber to associate a common ring tone 18 to a grouping of communications addresses. Should any member of a group call or send a communication, the common ring tone 18 alerts the called party subscriber to the caller's or sender's group identity. If all members of a cub scout troop, for example, share a common group identifier, then the common ring tone 18 alerts the called party subscriber that a troop member is calling. If an employer's advertising jingle is heard, then the subscriber knows a co-worker is calling. If a collegiate fight song is heard, then the caller/sender may share the same grouping as other collegiate buddies. Exemplary embodiments thus permit common, personalized ring tones for members of groups.

Moreover, the common ring tone 18 provides subject matter context. When the called party's communications device 14 produces the common ring tone 18, the called party subscriber immediately knows the caller's or sender's group identity. That group identity, though, may also provide context. That is, the common ring tone 18 may imply the subject matter of the incoming communication 12. When the cub scouts' common ring tone is seen/heard, for example, the called party subscriber may infer that the subject matter of the communication involves a troop issue. If the employer's advertising jingle is heard, then perhaps an email concerns an employment task or situation. The common ring tone 18, then, may also provide subject matter context for incoming calls, emails, and other communications.

The common ring tone 18 may thus represent social relationships. Ring tones may be defined for social networking groups, such as FACEBOOK® and MY SPACE®. If the calling party and/or the called party is a FACEBOOK® or MY SPACE® friend, for example, a predetermined ring tone may be presented to alert of that social group. FACEBOOK® friends may have a different ring tone from MY SPACE® friends. Similarly, ring backs may be defined for other social and professional networking groups.

Exemplary embodiments may also infer relationships. Because the subscriber's address book 82 may include mappings or associations between the caller's communications address 32 and the corresponding group identifier 130, exemplary embodiments may infer relationships by the type and structure of the end-point address associated with a contact (such as the caller's communications address 32). For example, when the caller has a TWITTER® identifier in the subscriber's address book 82, that identifier would imply that the caller/sender is a TWITTER® user. If a FACEBOOK® identifier is retrieved or obtained, FACEBOOK® may be inferred. The group identifier 130, then, may be used to obtain social networking relationships and a corresponding ring tone.

Exemplary embodiments may infer other relationships, too. When for example, the calling party and the called party are both FACEBOOK® "friends," for example, the subscriber's address book 82 may include a social graph that reveals other relationships. Second-order "friends of a friend," may have a different ring tone than first-order friends. A first-order friend may have a distinctive ring tone, while second-order friends of that friend all have a different, common ring tone.

Open access to social networking sites may also spawn relationships. With open access to a social networking website's underlying social graph, one could easily identify individuals within the social graph by using the called party's address book (e.g., the subscriber's address book 82) as an index into various social graphs. The relationship order is then determined by a shortest route map traversal from the called party to the calling party.

Figure 9:
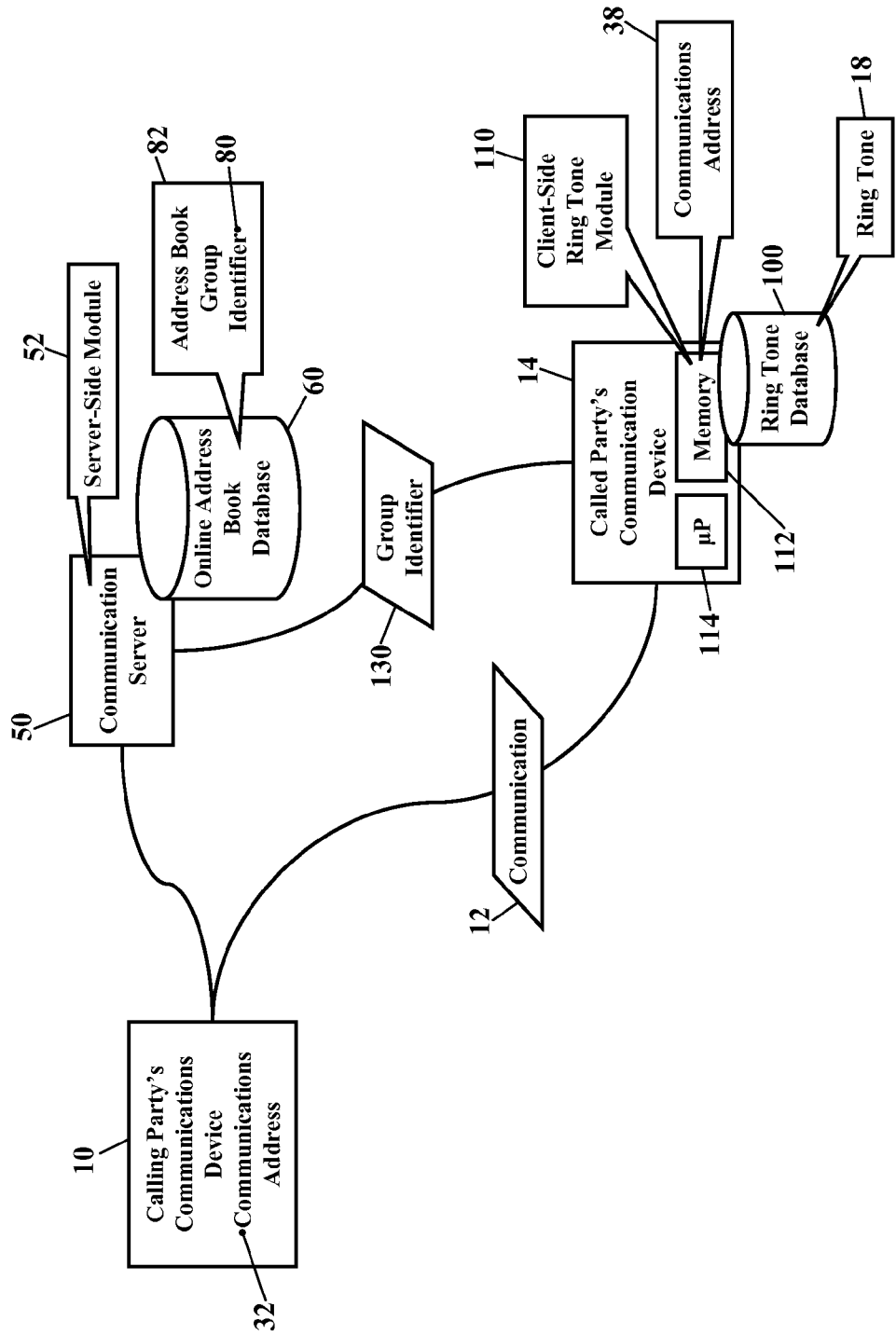
FIG. 9 is another schematic illustrating local retrieval of the ring tone, according to exemplary embodiments.

FIG. 9 is another schematic illustrating local retrieval of the ring tone 18, according to exemplary embodiments. As FIGS. 7 and 8 illustrated, the server-side ring tone module 52 may use the calling party's communications address 32, and/or the called party's communications address 38, to select the group identifier 130. Once the group identifier 130 is known, the server-side ring tone module 52 may then send the group identifier 130 to the called party's communications device 14. The group identifier 130, for example, may be packetized and sent to the communications address 38 associated with the called party's communications device 14. The group identifier 130 may additionally or alternatively be sent over a signaling channel and routed to the called party's communications device 14.

Regardless, the group identifier 130 may be used to locally retrieve the personalized ring tone 18. When the group identifier 130 is received, the client-side ring tone module 110 may then consult the ring tone database 100. Here, again, the ring tone database 100 is locally stored and maintained in the memory 112 of the called party's communications device 14. The client-side ring tone module 110 queries the ring tone database 100 for the group identifier 130. The client-side ring tone module 110 retrieves the common ring tone 18 that is associated with the group identifier 130. The client-side ring tone module 110 then instructs the processor 114 to produce or present the ring tone 18 to alert of the incoming communication 12 from the calling party's communications device 10. The common ring tone 18 alerts the called party subscriber to the caller's or sender's group identity. The common ring tone 18 may also provide subject matter context for the incoming communication 12.

Figure 10:
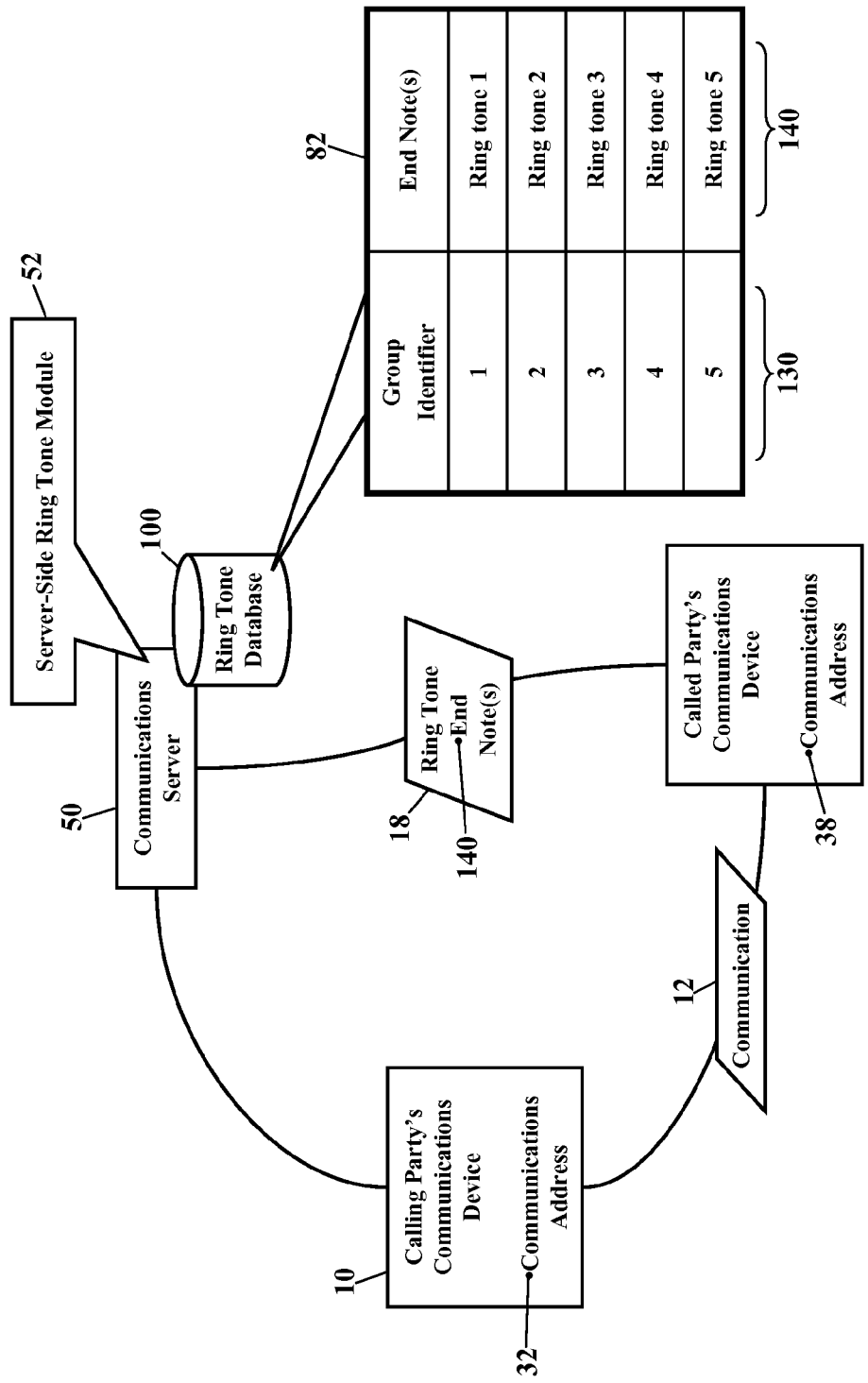
FIGS. 10 and 11 are schematics illustrating end notes, according to exemplary embodiments.
Figure 11:
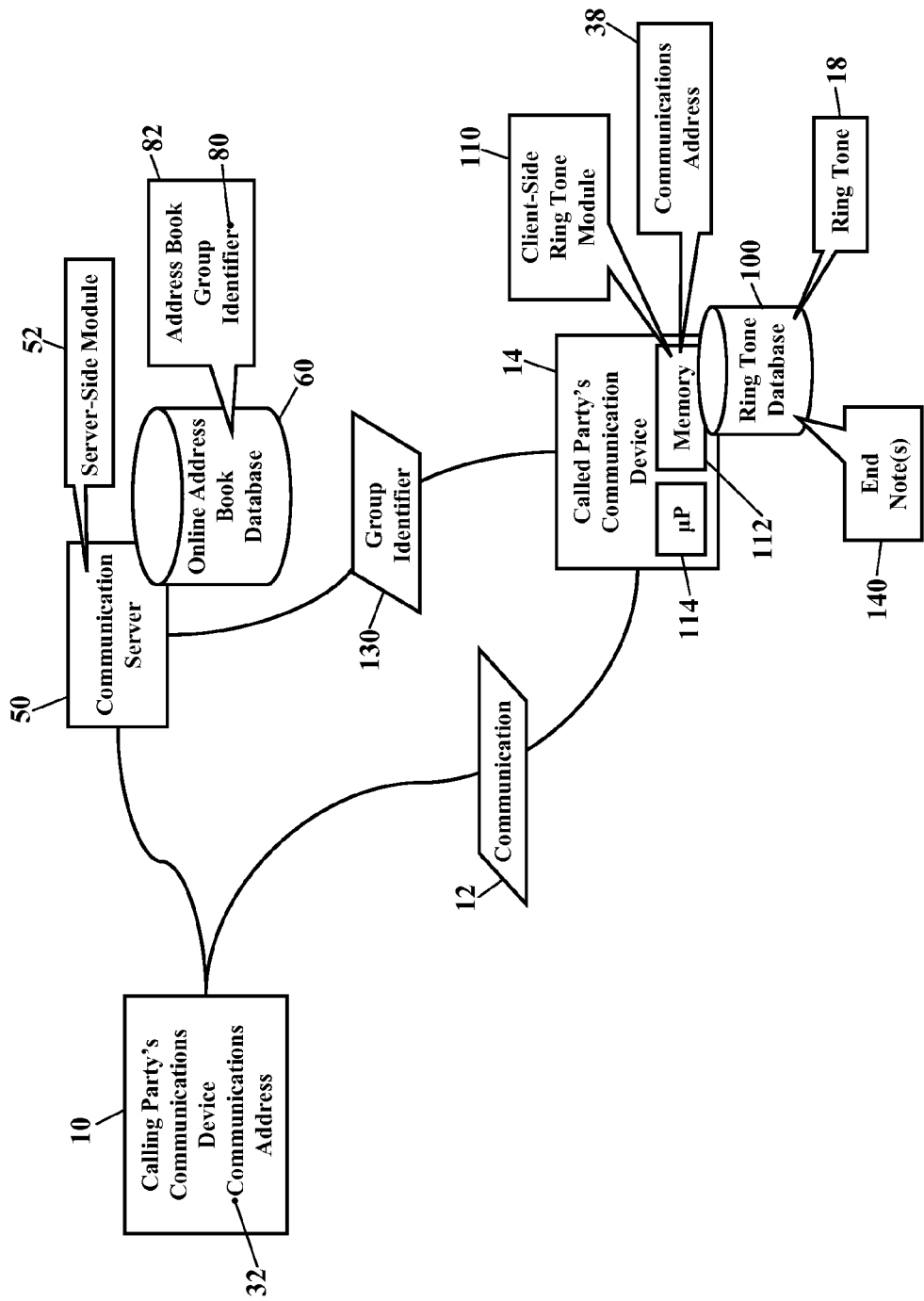

FIGS. 10 and 11 are schematics illustrating end notes, according to exemplary embodiments. Here one or more notes may be appended to any ring tone. These notes are preferably played after any ring tone to indicate that the sender or caller is associated with a group. The end notes, then, signify that the calling party is a member of a group, and the end note(s) may identify the subject matter context of the incoming communication 12. As FIG. 10 illustrates, once the group identifier 130 is known (as the paragraphs accompanying FIGS. 7 and 8 explained), the server-side ring tone module 52 may then query the ring tone database 100 for the group identifier 130. Here, though, the ring tone database 100 associates the group identifier 130 to one or more end note(s) 140. The ring tone database 100 retrieves the end note(s) 140 associated with the group identifier 130. The server-side ring tone module 52 then causes the communications network (illustrated as reference numeral 16 in FIG. 1) to process the end note(s) 140 as an audible and/or visual alert to the incoming communication 12. The end note(s) may be appended to any standard, generic, or custom ring tone 18 that is sent to the called party's communications device 14. The end note(s) 140 are preferable played nearly immediately after the ring tone 18. The standard, generic, or custom ring tone 18 thus provides the initial alert to obtain the called party's attention. The appended end note(s) 140 then identify the sender's or caller's group membership and perhaps contextual subject matter.

FIG. 11 illustrates local retrieval of the end note(s) 140. As FIGS. 7 and 8 illustrated, the server-side ring tone module 52 may use the calling party's communications address 32, and/or the called party's communications address 38, to select the group identifier 130. Once the group identifier 130 is known, the server-side ring tone module 52 may then cause the communications server 50 to send the group identifier 130 to the called party's communications device 14. When the group identifier 130 is received, the client-side ring tone module 110 queries the ring tone database 100 for the group identifier 130. The client-side ring tone module 110 retrieves the end note(s) 140 that is/are associated with the group identifier 130. The client-side ring tone module 110 then causes the called party's communications device 14 to append the end note(s) 140 to any standard, generic, or custom ring tone. The end note(s) 140 alert the called party subscriber to the caller's or sender's group identity.

Figure 12:
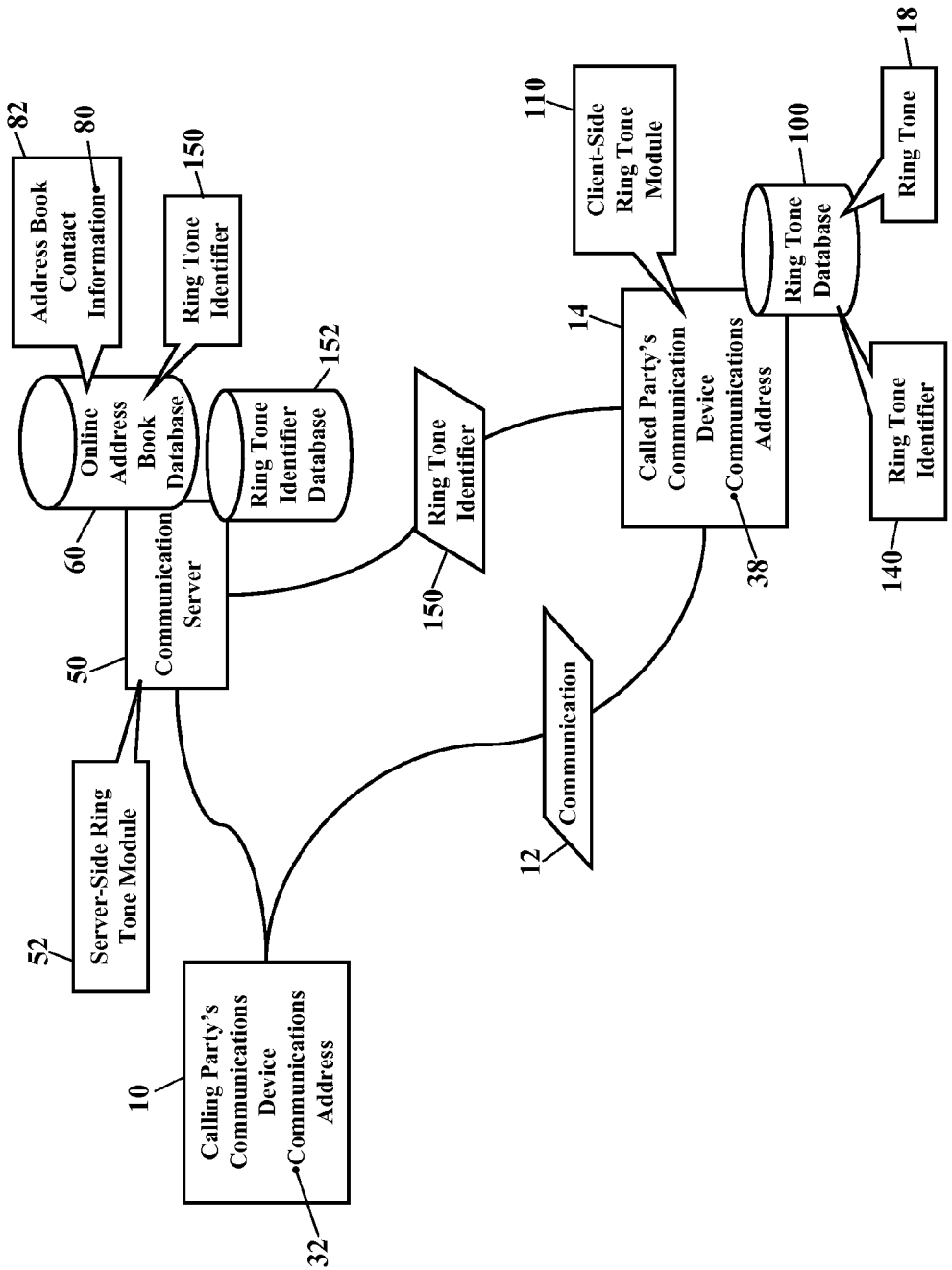
FIG. 12 is a schematic illustrating a ring tone identifier, according to exemplary embodiments.

FIG. 12 is a schematic illustrating a ring tone identifier 150, according to exemplary embodiments. Here the called party's communications device 14 is only provided the ring tone identifier 150, and the called party's communications device 14 must locally or remotely retrieve the personalized ring tone 18 that corresponds to the ring tone identifier 150. Because much of FIG. 12 is similar to FIGS. 2-5, FIG. 12 is only simply illustrated and briefly described. When the calling party's communications device 10 initiates or sends the communication 12, the communication 12 is processed for eventual delivery or termination at the called party's communications device 14. The server-side ring tone module 52 queries the online address book database 60 for the called party's communications address 38. The online address book database 60 performs a lookup and retrieves the corresponding address book 82 that is associated with the called party's communications address 38. The server-side ring tone module 52 then queries the called party's address book 82 for the calling party's communications address 32. The server-side ring tone module 52 retrieves the contact information 80 associated with the calling party's communications address 32. The server-side ring tone module 52 then queries a ring tone identifier database 152 for the contact information 80. The ring tone identification database 152 associates the contact information 80 to the ring tone identifier 150. The ring tone identifier 150 is any information that represents or indicates what ring tone is desired for the corresponding contact information 80. The ring tone identifier 150, for example, may be a file name of the ring tone 18 associated with the contact information 80. The ring tone identification database 152 retrieves the ring tone identifier 150 associated with the contact information 80. The server-side ring tone module 52 then causes the communications server 50 to send the ring tone identifier 150 to the called party's communications device 14. The client-side ring tone module 110 then queries the ring tone database 100 for the ring tone identifier 150. The ring tone database 100 is again illustrated as being locally stored in the called party's communications device 14, but the ring tone database 100 may be remotely stored and accessed via the communications network (illustrated as reference numeral 16 in FIG. 1). The client-side ring tone module 110 retrieves the associated, personalized ring tone 18 and the called party's communications device 14 presents the personalized ring tone 18 as an alert to the incoming communication 12.

Figure 13:
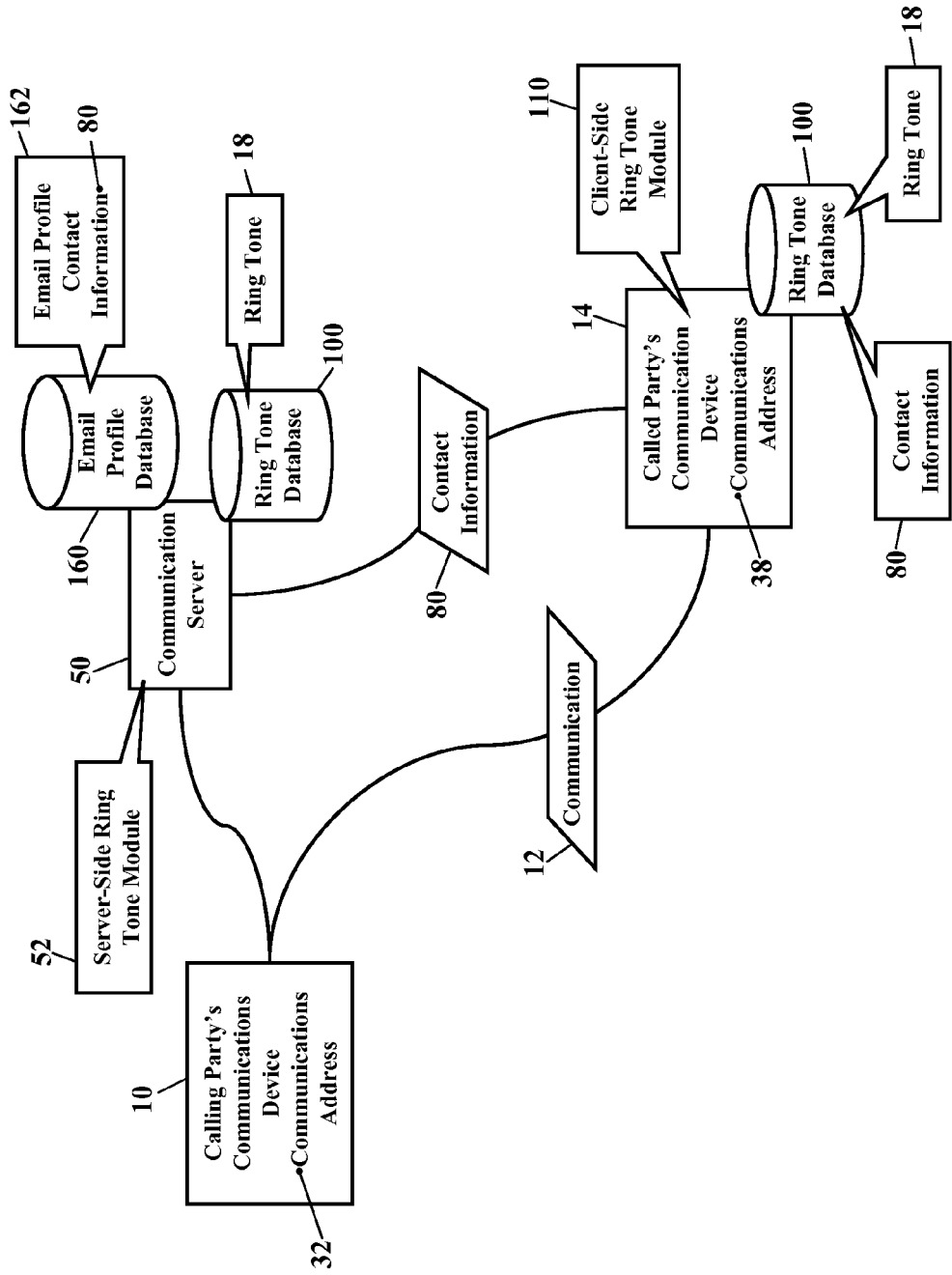
FIG. 13 is a schematic illustrating email profiles, according to exemplary embodiments.

FIG. 13 is a schematic illustrating email profiles, according to exemplary embodiments. The above paragraphs explained how the contact information 80 from a subscriber's address book 82 may be used to provide a personalized ring tone service. As the subscriber's number of contacts grows, however, the subscriber's address book may become too large and unwieldy for synchronous use amongst multiple devices. Exemplary embodiments, then, may utilize the online address book database 60 for centralized storage of the subscriber's corresponding address book 82.

This centralized concept may be extended to email profiles. As a subscriber's email profile grows, the email profile may become too large and unwieldy for synchronous use amongst multiple devices. As those of ordinary skill in the art understand, email profiles are often established in many software applications that manage the subscriber's email, calendar, contacts, and task activities. An email profile, for example, is established by MICROSOFT® OUTLOOK® to store email activity, calendaring information, the contact information 80, and task information. When the subscriber sends and receives emails, makes an appointment in their electronic calendar, sets a task, or saves a contact address, that information is stored in the subscriber's corresponding email profile. MICROSOFT® OUTLOOK® creates and maintains all this information in an email profile file (such as a .pst file), and other software applications create similar profile files (because these email profiles are so well known, no further explanation is needed). If the subscriber wishes to synchronize this information between multiple devices (such as a laptop computer, desktop computer, and cell phone), the subscriber's .pst file must be exported and imported amongst the multiple communications devices. As the subscriber's profile information grows, though, the subscriber's email profile file may become too large for import/export operations. Many devices, for example, will not save a file that exceeds 4 GB in size. A subscriber's email profile (e.g., .pst file) may easily exceed that size limitation.

FIG. 13, then, illustrates a centralized email profile database 160. The email profile database 160 is a centralized, online repository for the subscriber's corresponding email profile 162. As the subscriber's email activity, calendaring activity, and other profile information grows, the email profile database 160 provides a single repository for all of the subscriber's email, calendar, contacts, and task information. The email profile database 160 is illustrated as being stored in the communications server 50, but email profile database 160 may be remotely queried and accessed via the communications network (illustrated as reference numeral 16 in FIG. 1). When the calling party's communications device 10 sends or places the communication 12, the server-side ring tone module 52 queries the email profile database 160 for the called party's communications address 38. The email profile database 160 performs a lookup and retrieves the corresponding email profile 162 that is associated with the called party's communications address 38.

The server-side ring tone module 52 may then retrieve the contact information 80. Once the called party's corresponding email profile 162 is obtained from the email profile database 160, the called party's email profile 162 may be used to retrieve the contact information 80. The server-side ring tone module 52 queries the called party's email profile 162 for the calling party's communications address 32. The server-side ring tone module 52 retrieves the contact information 80 associated with the calling party's communications address 32.

Now that the contact information 80 is known, the personalized ring tone 18 may be selected. The server-side ring tone module 52, for example, may then query the ring tone database 100 for the contact information 80. The ring tone database 100 retrieves the personalized ring tone 18 associated with the contact information 80. The server-side ring tone module 52 then causes the communications network 16 to process the personalized ring tone 18 as an audible and/or visual alert to the incoming communication 12.

The personalized ring tone 18, however, may also be locally selected. Once the contact information 80 is obtained from the called party's email profile 162, the server-side ring tone module 52 may send the contact information 80 to the called party's communications device 14. The client-side ring tone module 110 then queries the ring tone database 100 for the contact information 80. FIG. 13 also illustrates the ring tone database 100 as being optionally locally stored in the called party's communications device 10. The client-side ring tone module 110 retrieves the ring tone 18 that is associated with the contact information 80. The client-side ring tone module 110 then instructs the called party's communications device 10 to produce or present the ring tone 18 to alert of the incoming communication 12 from the calling party's communications device 10.

Figure 14:
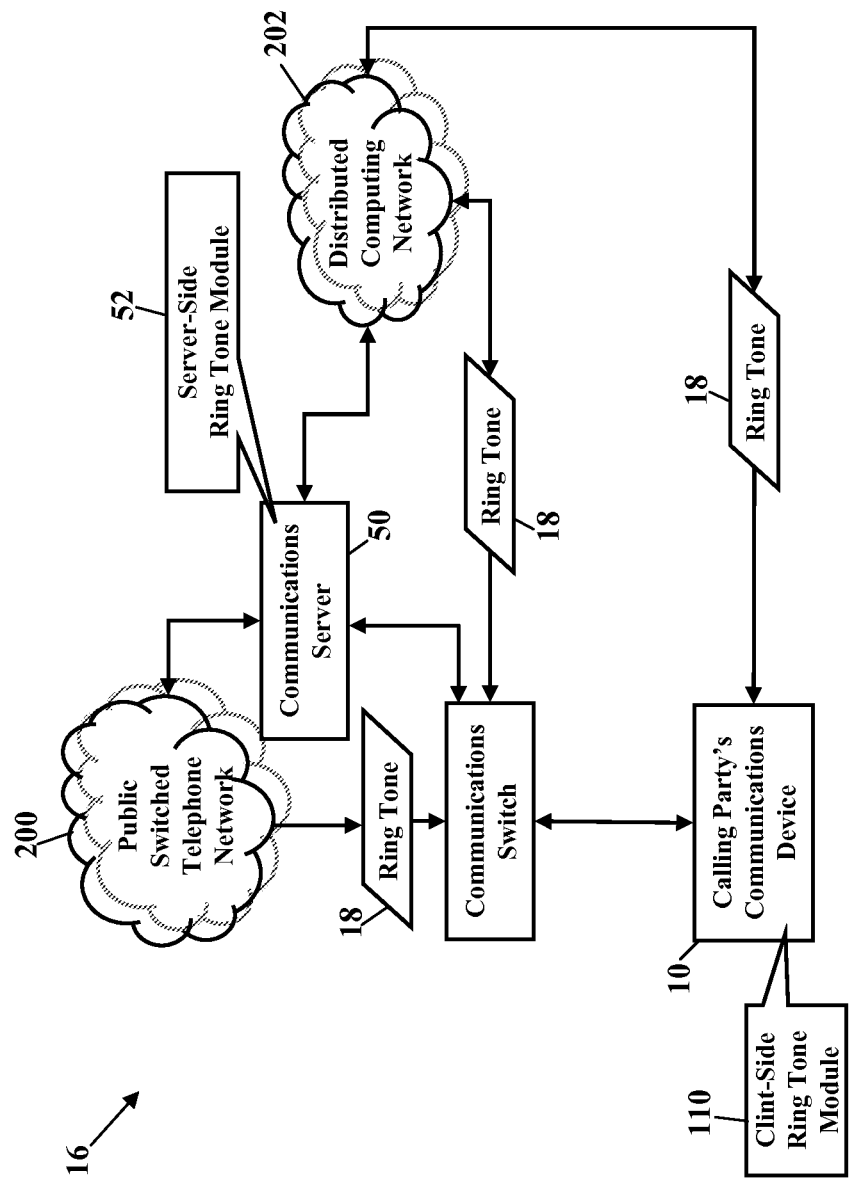
FIGS. 14-16 illustrate other operating environments, according to exemplary embodiments.

FIG. 14 illustrates another operating environment, according to exemplary embodiments. Here the server-side ring tone module 52 and the client-side ring tone module 110 may interface with a Public Switched Telephone Network 200 and with a distributed computing network 202 (such as the Internet or local-area network). As those of ordinary skill in the art understand, this operating environment may utilize a packet protocol, such as the Session Initiation Protocol (SIP). This operating environment may also utilize voice service protocols, triggers, and/or operations that allow the Public Switched Telephone Network 200 and the distributed computing network 202 to interoperate. The communications server 50, for example, may interface with a packet-based "softswitch" that uses software control to provide voice, data, and video services by dynamically changing its connection data rates and protocols types. The communications server 50 may alternatively or additionally include Advanced Intelligent Network (AIN) componentry. This operating environment, however, is well understood in the art and will not be further described. If a reader desires a more detailed explanation, the reader is directed to U.S. Pat. No. 5,430,719 issued to Weisser (Jul. 4, 1995) and to U.S. Pat. No. 5,917,817 issued to Dunn et al. (Jun. 29, 1999).

Figure 15:
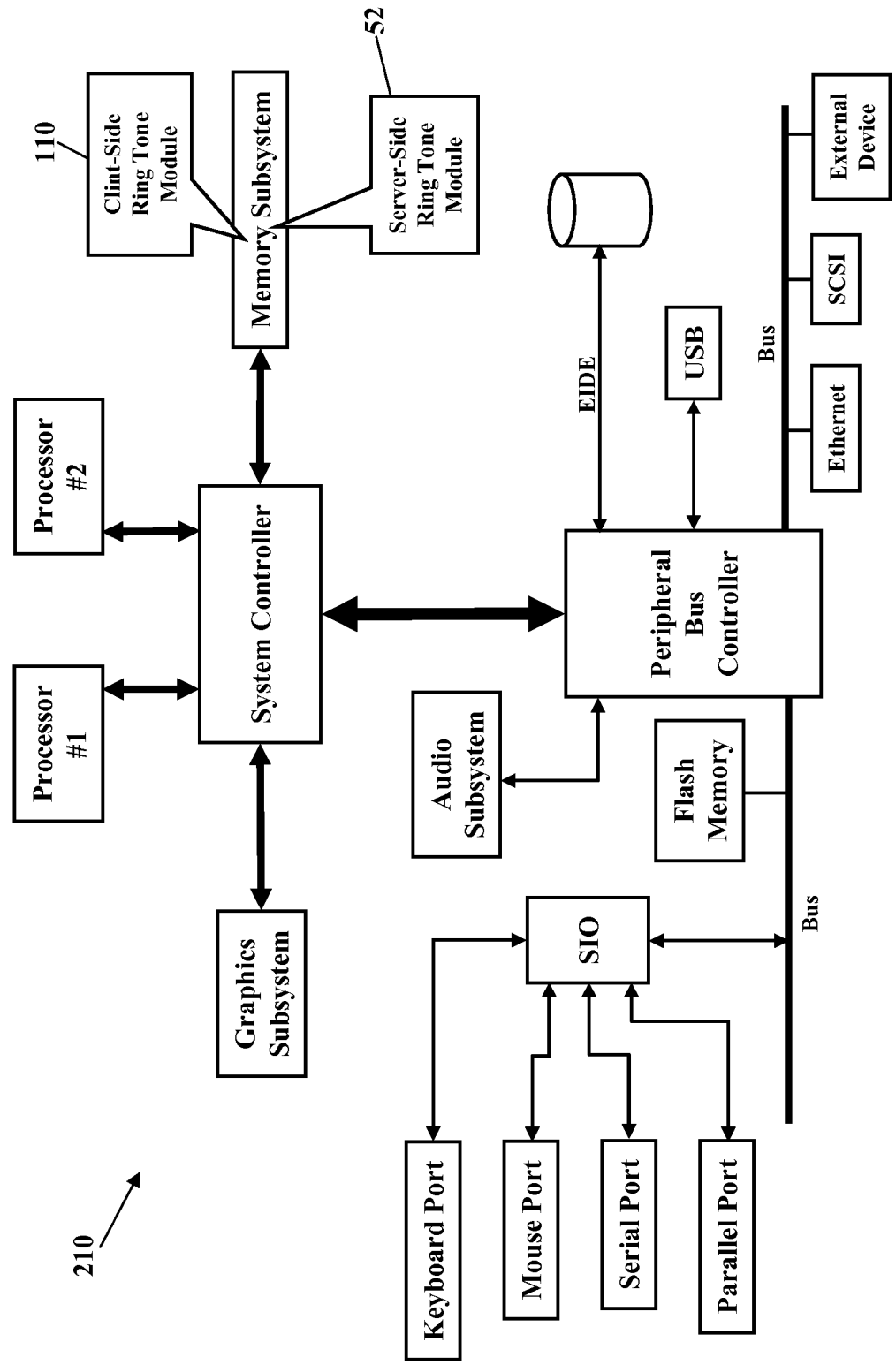
Figure 16:
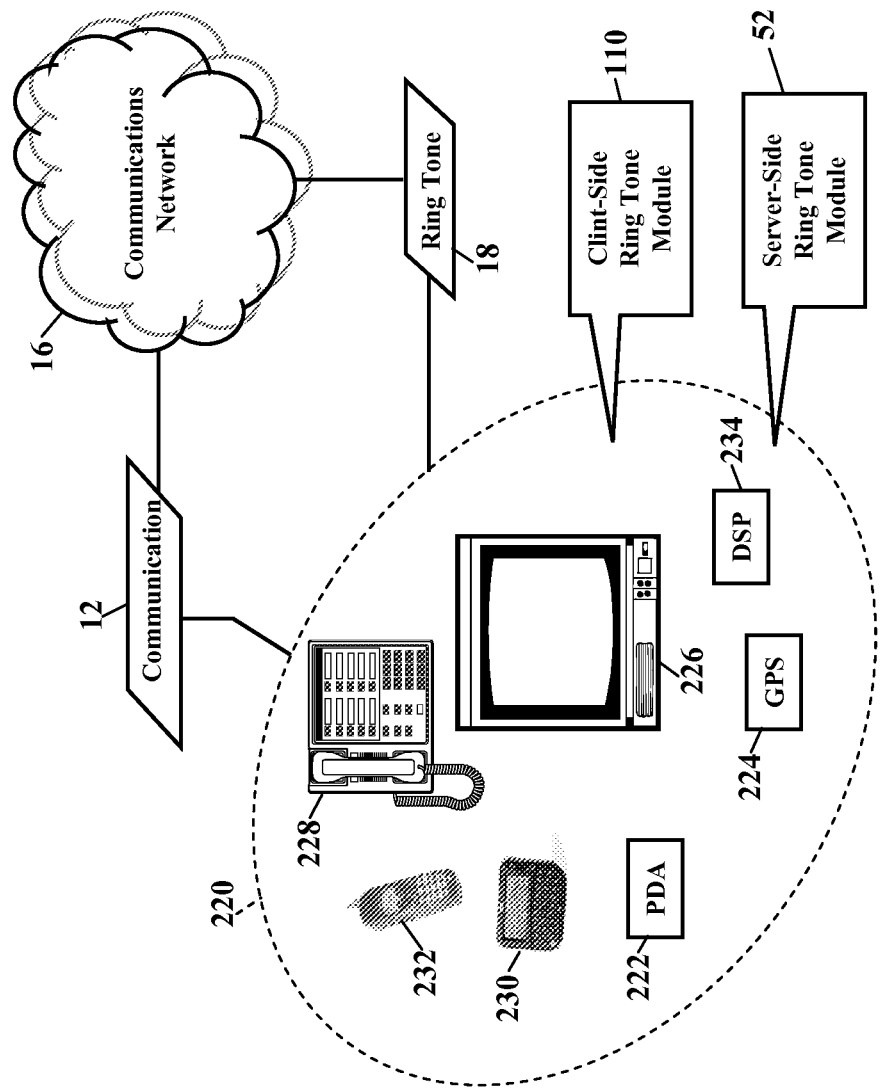

FIGS. 15-16 are schematics illustrating still more exemplary embodiments. FIG. 15 is a generic block diagram illustrating the server-side ring tone module 52, and/or the client-side ring tone module 110, may operate within a processor-controlled device 210. The server-side ring tone module 52 and/or the client-side ring tone module 110 may be stored in a memory subsystem of the processor-controlled device 210. One or more processors communicate with the memory subsystem and execute the server-side ring tone module 52 and/or the client-side ring tone module 110. Because the processor-controlled device 210 illustrated in FIG. 15 is well-known to those of ordinary skill in the art, no detailed explanation is needed.

FIG. 16 illustrates that the server-side ring tone module 52, and/or the client-side ring tone module 110, may also entirely or partially operate within various other communications devices 220. As FIG. 16 shows, the server-side ring tone module 52 and/or the client-side ring tone module 110 may operate in a personal digital assistant (PDA) 222, a Global Positioning System (GPS) device 224, an interactive television 226, an Internet Protocol (IP) phone 228, a pager 230, a cellular/satellite phone 232, or any computer system and/or communications device utilizing a digital signal processor (DSP) 234. The communications devices 220 may also include watches, radios, vehicle electronics, clocks, printers, gateways, and other apparatuses and systems.

Figure 17:
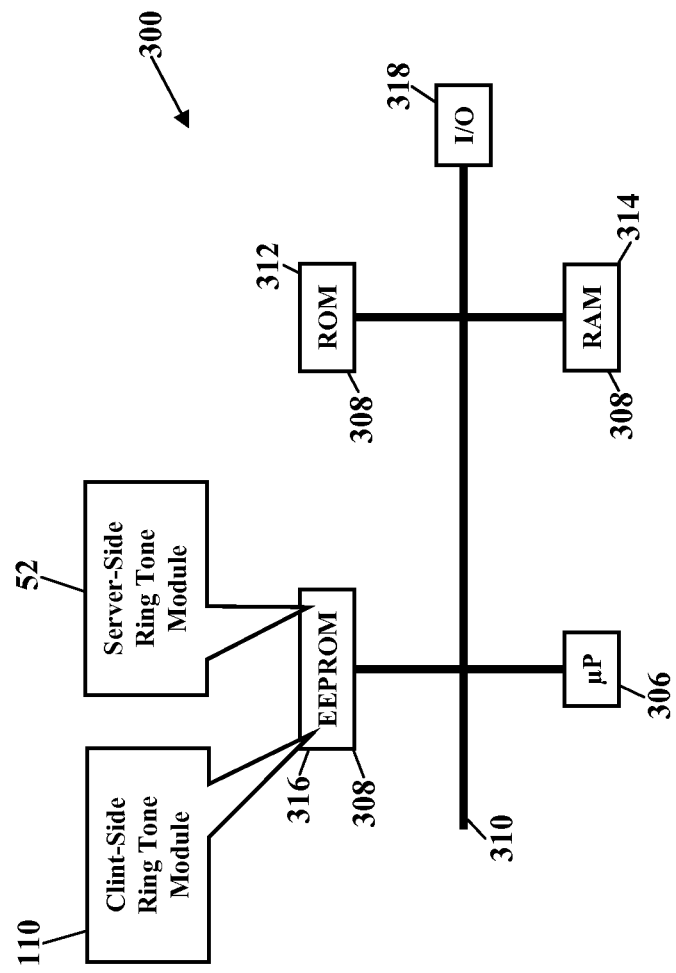

FIGS. 17-19 are schematics further illustrating various communications devices for presenting ring tones, according to exemplary embodiments. FIG. 17 is a block diagram of a Subscriber Identity Module 300, while FIGS. 18 and 19 illustrate, respectively, the Subscriber Identity Module 300 embodied in a plug 302 and in a card 304. As those of ordinary skill in the art recognize, the Subscriber Identity Module 300 may be used in conjunction with many communications devices (such as those illustrated in FIGS. 14-16). The Subscriber Identity Module 300 stores user information (such as the user's International Mobile Subscriber Identity, the user's K, number, and other user information) and any portion of the server-side ring tone module 52 and/or the client-side ring tone module 110. As those of ordinary skill in the art also recognize, the plug 302 and the card 304 each interface with the communications device. While exemplary embodiments are applicable to any standard, some such standards are GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts,*" and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 19 is a block diagram of the Subscriber Identity Module 300, whether embodied as the plug 302 of FIG. 17 or as the card 304 of FIG. 18. Here the Subscriber Identity Module 300 comprises a microprocessor 306 (µP) communicating with memory modules 308 via a data bus 310. The memory modules 308 may include Read Only Memory (ROM) 312, Random Access Memory (RAM) and or flash memory 314, and Electrically Erasable-Programmable Read Only Memory (EEPROM) 316. The Subscriber Identity Module 300 stores some or all of the server-side ring tone module 52 and/or the client-side ring tone module 110 in one or more of the memory modules 308. FIG. 19 shows the server-side ring tone module 52 and/or the client-side ring tone module 110 residing in the Erasable-Programmable Read Only Memory 316, yet either module may alternatively or additionally reside in the Read Only Memory 312 and/or the Random Access/Flash Memory 314. An Input/Output module 318 handles communication between the Subscriber Identity Module 300 and the communications device. Because Subscriber Identity Modules are well known in the art, this patent will not further discuss the operation and the physical/memory structure of the Subscriber Identity Module 300. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 20:
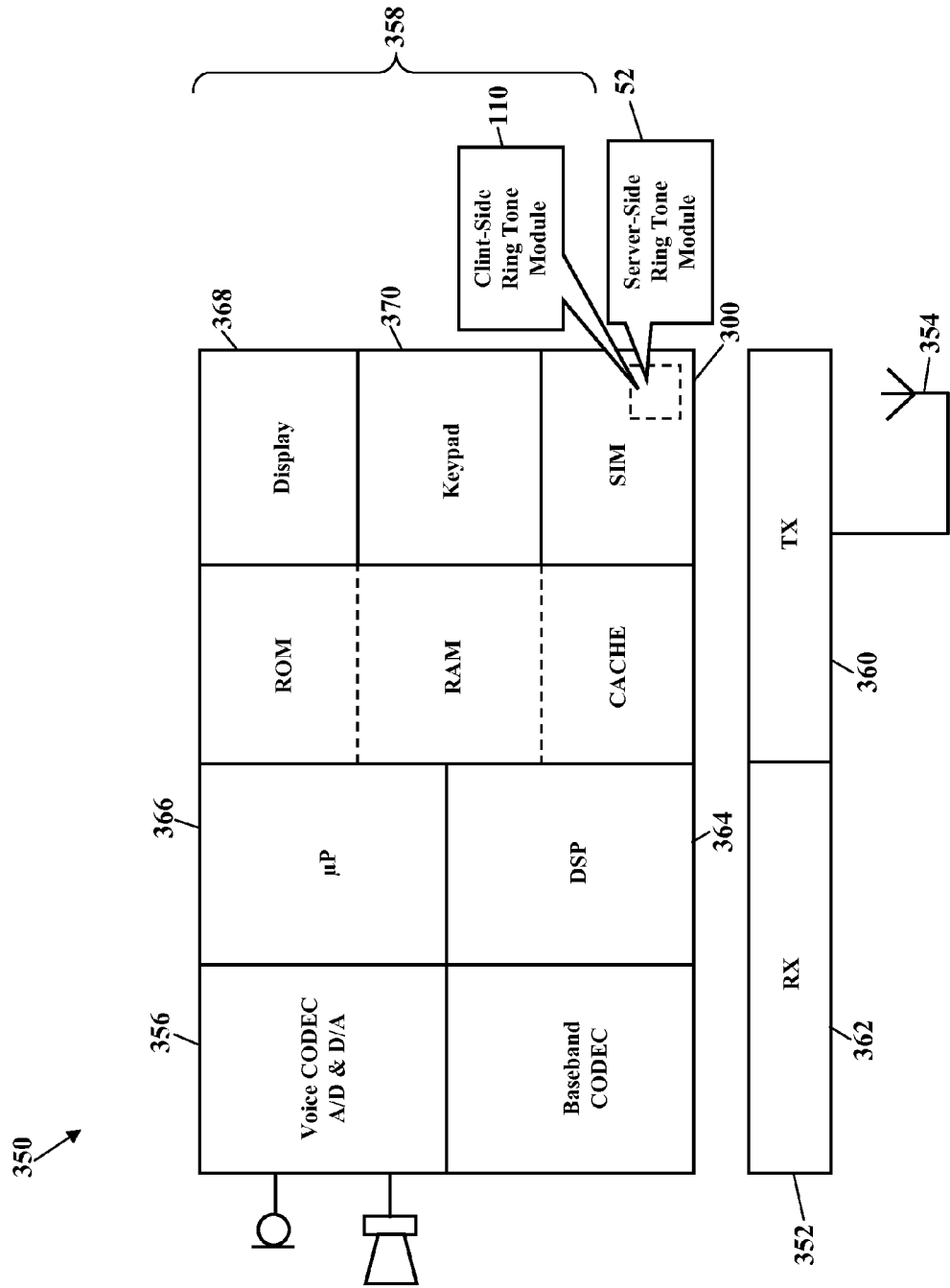

FIG. 20 is a schematic further illustrating various communications devices for presenting ring tones, according to exemplary embodiments. FIG. 20 is a block diagram of another communications device 350 utilizing the server-side ring tone module 52 and/or the client-side ring tone module 110. Here the communications device 350 comprises a radio transceiver unit 352, an antenna 354, a digital baseband chipset 356, and a man/machine interface (MMI) 358. The transceiver unit 352 includes transmitter circuitry 360 and receiver circuitry 362 for receiving and transmitting radiofrequency (RF) signals. The transceiver unit 352 couples to the antenna 354 for converting electrical current to and from electromagnetic waves. The digital baseband chipset 356 contains a digital signal processor (DSP) 364 and performs signal processing functions for audio (voice) signals and RF signals. As FIG. 20 shows, the digital baseband chipset 356 may also include an on-board microprocessor 366 that interacts with the man/machine interface (MMI) 358. The man/machine interface (MMI) 358 may comprise a display device 368, a keypad 370, and the Subscriber Identity Module 300. The on-board microprocessor 366 may perform TDMA, CDMA, GSM or other protocol functions and control functions for the radio circuitry 360 and 362, for the display device 368, and for the keypad 370. The on-board microprocessor 366 may also interface with the Subscriber Identity Module 300 and with the server-side ring tone module 52 and/or the client-side ring tone module 110. Because the functional architecture of the communications device 350 is well known to those of ordinary skill in the art, the communications device 350 will not be further discussed. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997).

Exemplary embodiments may be applied to any signaling standard. As those of ordinary skill in the art recognize, FIGS. 17-19 may illustrate a Global System for Mobile (GSM) communications device. That is, the communications device may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Figure 21:
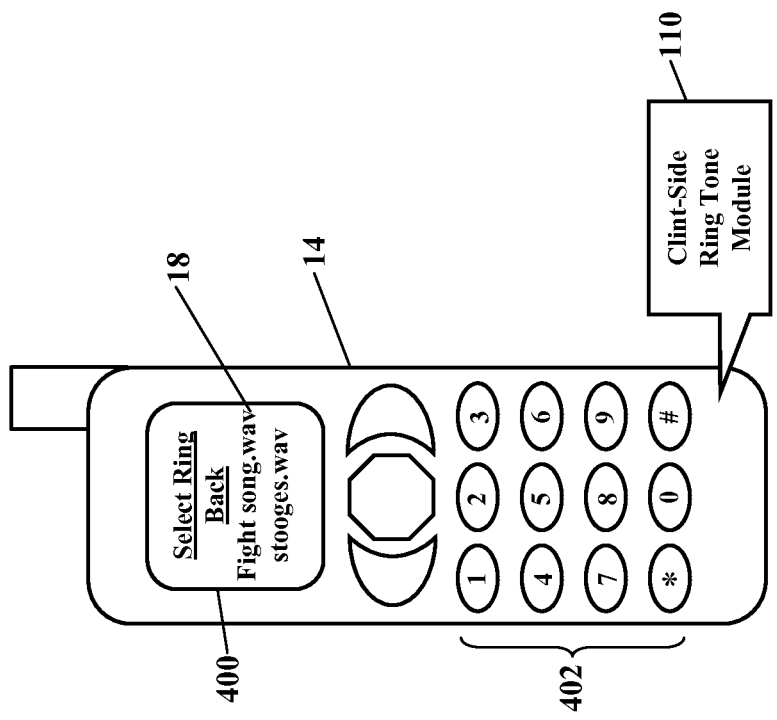
FIG. 21 is another schematic illustrating a ring tone service, according to exemplary embodiments.

FIG. 21 is another schematic illustrating this ring tone service, according to exemplary embodiments. FIG. 21 illustrates a graphical user interface 400 that maybe displayed by the called party's communications device 14. The graphical user interface 400 allows the called party to select the personalized ring tone 18 that is presented to the calling party. The graphical user interface 400 may provide a selection of ring tones to the called party. The called party may use a keypad 402 or other control to scroll through the graphical user interface 400 and to select the desired personalized ring tone 18. The called party may then associate the calling party's communications address (illustrated as reference numeral 32 in FIG. 2) with the desired personalized ring tone 18. The association may be even be automatically performed by the client-side ring tone module 110 (or by the server-side ring tone module 52 illustrated in FIG. 2), such as when a calling number or Internet Protocol address is received with an incoming call or incoming communication. Once the called party selects the desired personalized ring tone 18, the client-side ring tone module 110 associates the ring tone 18 to the contact information 80, to the group identifier 130, and/or to the email profile 162 (as the above paragraphs explained).

Exemplary embodiments may be applied to an Internet Protocol environment. Exemplary embodiments may analyze a header portion and/or a payload portion of one or more packets of data. The header portion and/or the payload portion may include data representing a calling number, a called number, a sender's Internet Protocol address, and/or a recipient's Internet Protocol address. Exemplary embodiments may then use this packetized data to retrieve the personalized ring tone 18, as the above paragraphs explained.

FIG. 22 is a flowchart illustrating a method of providing the personalized ring tone 18, according to exemplary embodiments. A graphical user interface is stored in memory (Block 500). The graphical user interface may be stored in the memory of a computer (such as the communications server 50), and the graphical user interface may be accessed/downloaded via the Internet. The graphical user interface may additionally or alternatively be locally stored in the memory of a communications device. The graphical user interface presents a selection of ring tones to the subscriber. The selection of ring tones allows the subscriber to specify the ring tone to be presented on the called party's communications device 14. The subscriber may be allowed to preview a ring tone (Block 502), thus allowing the subscriber to see, hear, feel, and/or otherwise experience the ring tone before selection. The subscriber's selection of a ring tone is accepted (Block 504), and the subscriber or network intelligence may associate the ring tone to a telephone number or an Internet Protocol address of a calling party (Block 506). The selected ring tone is processed (Block 508) and presented to alert of an incoming communication (Block 510).

FIG. 23 is another flowchart illustrating another method of providing the personalized ring tone 18, according to exemplary embodiments. A communication is processed from a first communications address to a second communications address (Block 600). An electronic database is queried for the second communications address (Block 602). Contact information 80, associated with the first communications address, is retrieved (Block 604). A group identifier 130 may be retrieved from the contact information 80 that associates the first communications address to a group of contacts (Block 606). A ring tone database is queried for the contact information and/or for the group identifier 130 (Block 608). The ring tone associated with the contact information 80 and the group identifier 130 is retrieved (Block 610) and processed to alert the second communications address to the communication from the first communications address (Block 612). The group identifier 130 may be sent to the second communications address (Block 614) and associated to end note(s) 140 (Block 616). The end note(s) 140 may be appended to an alert at the second communications address (Block 618).

The terms "processed," "process," "processing," and variants, as used herein, encompass any event from the time the calling party's communications device 10 initiates a communication to the termination of the communication. The terms "processed," "process," "processing," and variants include storing the ring tone 18 in memory, routing a voice path, signaling setup, and intelligence queries (e.g., Local Number Portability queries, queries to retrieve Calling/Called Name/Number information, AIN queries, and standard signaling messages to determine call routing paths). The terms "processed," "process," "processing," and variants also include monitoring an established telephone call for possible DTMF entry, switch hook flash, other events that indicate a party on the telephone call has requested something, and delivery of call waiting tones and data. The terms "processed," "process," "processing," and variants also include identification of packets, of packet headers, and of the payload contents of packets. The terms "processed," "process," "processing," and variants include deciphering the payload contents of a packet and acting on those payload contents. The terms "processed," "process," "processing," and variants also include storing ring tone selections in memory, retrieving those ring tone selections, and communicating those ring tone selections to the called party. The terms "processed," "process," "processing," and variants, however, also encompass billing activities and measurements at a switch or any other network element.

Exemplary embodiments may also be applied to busy signals. As most people know, when a telephone line is dedicated for a phone call and/or a data session, another caller hears a busy signal. This busy signal indicates the called party's line is engaged in a telephone/data session (e.g., Internet Call Waiting). Exemplary embodiments could also be applied to customizable busy signals. That is, the called party uses this service to determine the type of busy signal heard by the calling party. The calling party might hear a favorite song, view a picture, view portions of a movie, or see other graphics. The subscriber might even select personal pictures, self-composed music, and/or streamed audio and/or video content (such as radio, stock quotes, news, weather, and/or advertisements). The called party might also specify a busy signal by electronic calendar entries, such as the day of the week, the time of day, and/or appointments in the calendar. The called party subscriber may even associate particular busy signals to particular calling parties, thus providing a variety of personalized busy signals.

Exemplary embodiments may be physically embodied on or in a computer-readable medium. This computer-readable medium may include CD-ROM, DVD, tape, cassette, disk, memory card, and large-capacity disk. This computer-readable medium, or media, could be distributed to end-users, licensees, and assignees. A computer program product for providing ring tones to a called party comprises the computer-readable medium and processor-readable instructions for performing a method of providing ring tones, as the above paragraphs explained.

While exemplary embodiments have been described with respect to various features, aspects, and embodiments, those skilled and unskilled in the art will recognize exemplary embodiments are not so limited. Other variations, modifications, and alternative embodiments may be made without departing from the spirit and scope of the claims.

The invention claimed is:
1. A method, comprising:
processing a communication from a sending address to a recipient address;
querying a database for the recipient address, the database storing associations between different recipient addresses and different names of social networks;
retrieving a name of a social network associated with the recipient address;
querying an alert database for the name of the social network, the alert database associating the different names of the social networks to alerts;
retrieving an alert associated with the name of the social network; and
processing the alert to notify the recipient address of the communication from the sending address.
2. The method of claim 1, wherein retrieving the alert comprises retrieving a ring tone.
3. The method of claim 1, wherein processing the communication comprises processing a call.
4. The method of claim 1, wherein processing the communication comprises processing an electronic message.
5. The method of claim 1, further comprising sending the alert to the recipient address.
6. The method of claim 1, further comprising playing the alert.
7. The method of claim 1, further comprising receiving a selection of the alert to associate with the name of the social network.
8. A server, comprising:
a processor;

a memory storing instructions that when executed cause the processor to perform operations, the operations comprising:

receiving a recipient address associated with a communication from a sending address;

retrieving a recipient's electronic address book associated with the recipient address;

retrieving a group identifier from the recipient's electronic address book, the group identifier associated with the sending address and common to multiple sending addresses of a social network;

identifying an alert associated with the group identifier of the social network; and processing the alert to notify the recipient address of the communication from the sending address.

9. The system of claim 8, wherein the operations further comprise retrieving a ring tone.

10. The system of claim 8, wherein the operations further comprise processing a call.

11. The system of claim 8, wherein the operations further comprise processing an electronic message.

12. The system of claim 8, wherein the operations further comprise sending an identification of the alert to the recipient address.

13. The system of claim 8, wherein the operations further comprise playing the alert.

14. The system of claim 8, wherein the operations further comprise receiving a selection of the alert to associate with the group identifier of the social network.

15. A memory storing processor-executable instructions that when executed cause a processor to perform operations, the operations comprising:

receiving a recipient address associated with a communication from a sending address;

retrieving a recipient's electronic address book associated with the recipient address;

retrieving a group identifier from the recipient's electronic address book, the group identifier associated with the sending address and common to multiple sending addresses of a social network;

identifying an alert associated with the group identifier of the social network; and processing the alert to notify the recipient address of the communication from the sending address.

16. The memory of claim 15, wherein the operations further comprise retrieving a ring tone.

17. The memory of claim 15, wherein the operations further comprise processing a call.

18. The memory of claim 15, wherein the operations further comprise processing an electronic message.

19. The memory of claim 15, wherein the operations further comprise sending an identification of the alert to the recipient address.

20. The memory of claim 15, wherein the operations further comprise playing the alert.

\* \* \* \* \*